United States Patent [19]
Kanno et al.

[11] Patent Number: 5,583,566
[45] Date of Patent: Dec. 10, 1996

[54] COMBINED MEDICAL IMAGE AND DATA TRANSMISSION WITH DATA STORAGE, IN WHICH CHARACTER/DIAGRAM INFORMATION IS TRANSMITTED WITH VIDEO DATA

[75] Inventors: Masahide Kanno, Hachioji; Akihiko Yajima, Kunitachi, both of Japan

[73] Assignee: Olympus Optical Co., Ltd., Tokyo, Japan

[21] Appl. No.: 541,590

[22] Filed: Oct. 10, 1995

Related U.S. Application Data

[63] Continuation of Ser. No. 521,807, May 10, 1990, abandoned.

[30] Foreign Application Priority Data

| May 12, 1989 | [JP] | Japan | 1-119435 |
| Nov. 17, 1989 | [JP] | Japan | 1-299980 |

[51] Int. Cl.$^6$ .............. A61B 1/04; A61B 1/06; H04N 7/18
[52] U.S. Cl. .............. 348/72; 348/74; 348/75; 364/413.13; 600/109
[58] Field of Search .............. 348/65, 68, 69, 348/70, 71, 72, 74, 75; 364/413.13; 600/109

[56] References Cited

U.S. PATENT DOCUMENTS

| 4,349,032 | 9/1982 | Koyata | 128/660 |
|---|---|---|---|
| 4,727,417 | 2/1988 | Kanno et al. | 348/74 |
| 4,811,407 | 3/1989 | Blokker, Jr. et al. | 348/468 |
| 4,841,363 | 1/1989 | Ams et al. | 348/74 |
| 4,865,018 | 9/1989 | Kanno et al. | 348/72 |
| 4,880,011 | 11/1989 | Imade et al. | 128/662.06 |
| 4,885,634 | 12/1989 | Yabe | 348/71 |
| 4,908,707 | 3/1990 | Kinghorn | 348/460 |
| 4,916,539 | 4/1990 | Galumbeck | 348/467 |
| 4,977,455 | 12/1990 | Young | 348/460 |
| 4,996,598 | 2/1991 | Hara | 348/589 |
| 5,003,491 | 3/1991 | Heckt | 395/135 |
| 5,036,394 | 7/1991 | Morii et al. | 348/468 |
| 5,051,925 | 9/1991 | Kadono et al. | 395/150 |
| 5,054,491 | 10/1991 | Saito et al. | 128/662.06 |
| 5,070,404 | 12/1991 | Bullock et al. | 348/460 |
| 5,175,811 | 12/1992 | Sone et al. | 395/150 |
| 5,251,293 | 10/1993 | Ishii et al. | 395/150 |

OTHER PUBLICATIONS

English Language Abstract to JP 01–60071, "Image Pickup System", K. Ninomiya et al. Mar. 7, 1989.

*Primary Examiner*—Howard W. Britton
*Attorney, Agent, or Firm*—Armstrong, Westerman, Hattori, McLeland & Naughton

[57] ABSTRACT

A medical instrument interfacing apparatus including a video instrument for outputting a video signal on which the pattern information of at least one of a character and device is superimposed, a video signal transmitting apparatus for transmitting the video signal of the video instrument, a pattern discriminating apparatus for extracting the pattern information from the video signal transmitted from the video signal transmitting apparatus and a controlled instrument in which the signal of the pattern discriminating apparatus is input.

23 Claims, 27 Drawing Sheets

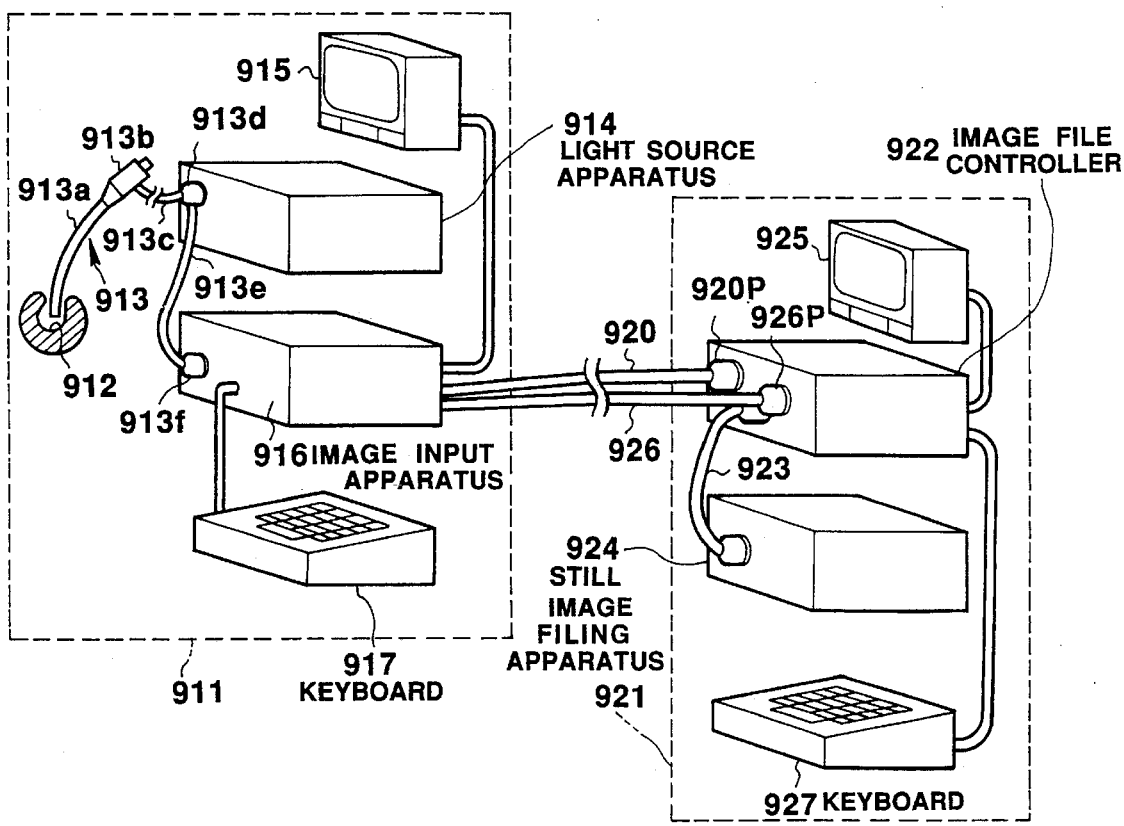

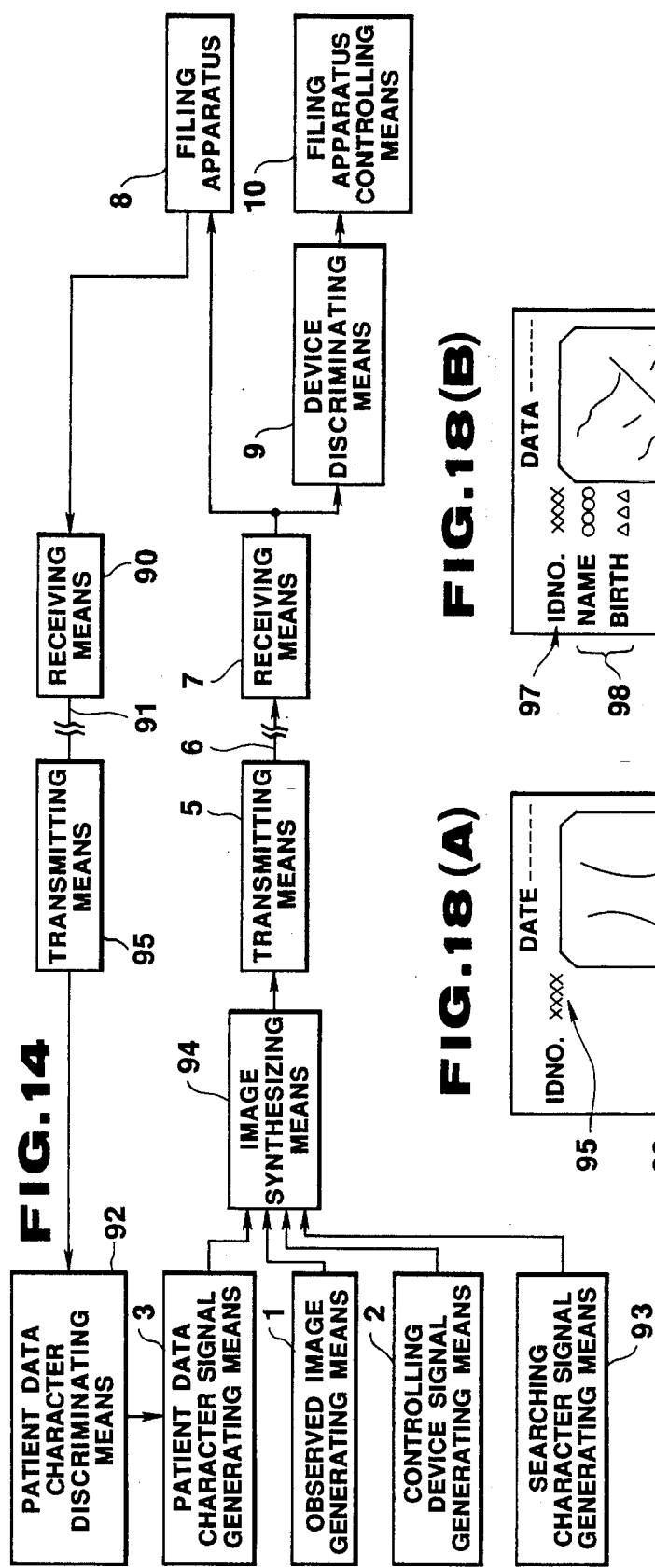
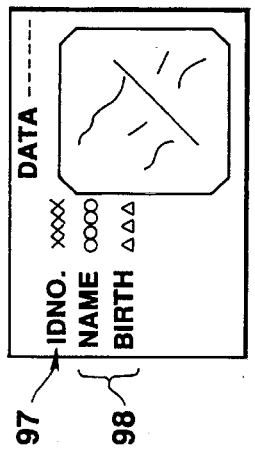
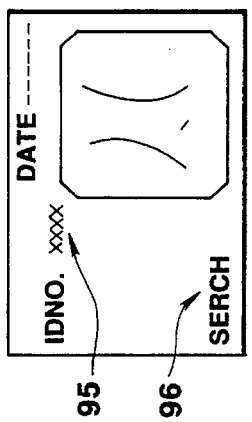

FIG. 30(A)

| PATIENT ID | NAME | SEX | DATE OF BIRTH | COMMENT |
|---|---|---|---|---|
| 1001 | A B C D E F | M | 19620219 | · · · · · · · · · · · · · |
| 1002 | · · · · · · | F | XXXXXXX | · · · · · · · · · · · · · |
| · · · | · · · | · · · | · · · | · · · |

FIG. 30(B)

| INSPECTION ID | INSPECTION DATE | PATIENT ID | DISC NO. | RECORD START POSITION NO. | RECORD END POSITION NO. |
|---|---|---|---|---|---|
| 1250 | 19890211 | XXXX | 1 | 12320 | 12344 |
| 1251 | 19890211 | 1001 | 2 | 12345 | 12360 |
| 1252 | 19890211 | 1002 | 2 | 12361 | 12380 |
| 1253 | 19890211 | XXXX | 3 | 12381 | XXXXX |
| · · · | · · · | · · · | · · · | · · · | · · · |

FIG. 30(C)

| DISC NO. | DATE OF REGISTRATION | FINAL RECORDING POSITION NO. |
|---|---|---|
| 001 | 19880920 | 10980 |
| 002 | 19881004 | 12380 |
| · · · · | · · · · · · · · | · · · · · |

5,583,566

COMBINED MEDICAL IMAGE AND DATA TRANSMISSION WITH DATA STORAGE, IN WHICH CHARACTER/DIAGRAM INFORMATION IS TRANSMITTED WITH VIDEO DATA

This application is a continuation of application Ser. No. 07/521,807 filed May 10, 1990, now abandoned.

BACKGROUND OF THE INVENTION

1. Field of the Invention

This invention relates to improvements of an interfacing apparatus between medical instruments.

2. Related Art Statement

Recently, with the diversification of video instruments, it has become necessary to operate a plurality of video instruments as related with each other.

The above described relationship is very high particularly between a medical electronic endoscope apparatus and an image filing apparatus for filing video images imaged by this electronic endoscope apparatus.

Therefore, the present applicant has suggested, for example, in the publication of a Japanese patent application No.270306/1988, an endoscope system in which an electronic endoscope apparatus and still picture filing apparatus are connected with each other.

FIG. 1 is of an example of the above described endoscope system wherein an endoscope apparatus 911 and image filing apparatus 921 are connected with each other through cables 920 and 926 so as to operate as related with each other through these cables 920 and 926.

The above mentioned electronic endoscope apparatus 911 comprises, for example, an endoscope 913 to be inserted into a body cavity 912, a light source apparatus 914 feeding an illuminating light to the tip of this endoscope 913, an image input apparatus 916 driving such imaging device as a solid state imaging device (CCD. The imaging device may be provided, for example, on the tip surface of the above mentioned endoscope 913 and making such signal processing as converting to a video signal the imaging signal photoelectrically converted by the above mentioned imaging device. The apparatus also includes a monitor 915 displaying the video signal from this image input apparatus 916 and a keyboard 917 for inputting a patient information or the like, the endoscope 913 is connected to the light source apparatus 914 and the endoscope 913, monitor 915 and keyboard 917 are connected to the image input apparatus 916.

The endoscope 913 comprises, for example, an elongate flexible insertable part 913a, a thick operating part 913b connected to this insertable part 913a in the hand base side base, a universal cord 913c extended from the side of this operating part 913b, a connector 913d provided at the end of this universal cord 913, a signal line 913e extended from this connector 913d and a connector 913f provided at the end of this signal line 913e, the connector 913d is connected to the light source apparatus 914 and the connector 913f is connected to the image input apparatus 916.

The above mentioned image filing apparatus 921 comprises an image file controller 922 controlling the respective devices of the image filing apparatus 921, a still image filing apparatus 924 recording video signals in such large capacity recording medium as a photodisc or photomagnetic disc, a monitor 925 displaying the video signal from the above mentioned image file controller 922 and a keyboard 927 for inputting a patient information or the like and the monitor 925, still image filing apparatus 924 through a signal line 923 and keyboard 927 are connected to the above mentioned image file controller 922.

In FIG. 3 is shown the formation of the above mentioned electronic endoscope apparatus 911.

The above mentioned light source apparatus 914 is provided with a lamp 930 generating a white color light, a rotary color filter provided with filters 932R, 932G and 932B separating this white color light respectively into R(red), G(green) and B(blue) lights and a motor 931 rotating and driving this rotary color filter 932 so that the illuminating lights separated into the wavelength regions of R, G and B may be fed to the entrance end surface of a light guide 933.

The exit end surface of the above mentioned light guide 933, a light distributing lens 934, an objective lens 935 and a CCD 936 which is a solid state imaging device are arranged in the tip part 913a of the above mentioned endoscope 913 so that the illuminating light led by the above mentioned light guide 933 may be radiated by the light distributing lens 934 and an object beam by the reflection of this illuminating light may be made to form an image on the imaging surface of the CCD 936 by the objective lens 935.

Further, a release switch 947 is provided, for example, in the operating part 913b of the above mentioned endoscope 913 and is connected to a character code transmitting circuit 950 of a later described image input apparatus 916.

The above mentioned image input apparatus 916 is provided with an amplifier 937 connected to the above mentioned CCD 936, a γ correcting circuit 938 connected to this amplifier 937, an A/D converter 939 connected to this γ correcting circuit 938, a selector 940 connected to this A/D converter 939, an R memory 941R, G memory 941G and B memory 941B connected to this selector 940, D/A converters 942R, 942G and 942B connected respectively to these R memory 941R, G memory 941G and B memory 941B, image signal synthesizing circuits 943R, 943G and 943B connected respectively to these D/A converters 942R, 942G and 942B and connected to a later described character signal generating circuit 946, a connector 948J connected to the above mentioned image synthesizing circuit 943R, 943G and 943B, a control signal generating part 944 connected to the above mentioned A/D converter 939, selector 940, R memory 941R, G memory 941G and B memory 941B, D/A converters 942R, 942G and 942B and a later described synchronizing signal generating circuit 945, the above mentioned synchronizing signal generating circuit 945, a character signal generating circuit 946 connected to a later described keyboard 917, a character code transmitting circuit 950 connected to the above mentioned release switch 947 and a later described keyboard 917 and a connector 947J connected to the above mentioned character code transmitting circuit 950.

The above mentioned keyboard 917 is connected to the character signal generating circuit 946 and character code transmitting circuit 950 of the above mentioned image input apparatus 916.

In the above described endoscope system, the light source of a lamp 930 provided within the light source apparatus 914 is separated into R, G and B by the filters 932R, 932G and 932B of the rotary color filter 932 rotated by the motor 931 rotated and driven by a synchronizing signal from the control signal generating part 944 of the image input apparatus 916 and is radiated to the entrance end surface of the light guide 933.

The light source separated into R, G and B as described above is led through the above mentioned light guide 933, is emitted from the exit end surface and is radiated to a part to be inspected or the like not illustrated by the light distributing lens 934.

The object beam by the above described illuminating lights of R, G and B is made to form an image on the photoelectric converting surface of the CCD 936 by the objective lens 935.

The above mentioned CCD 936 is driven by a signal line not illustrated, converts the object beam having formed the image on the photoelectric converting surface to an imaging signal and outputs the imaging signal to the amplifier 937.

The above mentioned amplifier 937 properly amplifies the input imaging signal and outputs it to the γ correcting circuit 938.

In the above mentioned γ correcting circuit 938, for example, the imaging signal has γ corrected, is converted to a video signal and is output to the A/D converter 939.

In the above mentioned A/D converter 939, the video signal which is an analogue signal is converted to a digital signal by the control signal of the above mentioned control signal generating part 944 and the digital signal is output to the selector 940.

In the above mentioned selector 940, by the control of the above mentioned control signal generating part 944, the output of the above mentioned A/D converter 939 is switched to the R memory 941R, G memory 941G or B memory 941B and is output. This switching is equal to the wavelength region R, G or B of the illuminating light radiated to the above described object to be imaged and, in case the illuminating light is, for example, R, the output will be to the R memory 941R.

The video signals memorized in the above mentioned R memory 941R, G memory 941G and B memory 941B are simultaneously read out by the control of the above mentioned control signal generating part 944 and are output to the D/A converters 942R, 942G and 942B. That is to say, the video signals of the object beam input in time series in the wavelength regions of R, G and B will be image signals made simultaneous.

In the above mentioned D/A converters 942R, 942G and 942B, the input video signals which are digital signals are converted to analogue signals and are output to the image synthesizing circuits 943R, 943G and 943B.

In the above mentioned image synthesizing circuits 943R, 943G and 943B, there are input not only the above described video signals but also the signals from the character signal generating circuit 946.

In this character signal generating circuit 946, the identification number (mentioned as the patient ID hereinafter), name and others of a patient input from the keyboard 917 are output as signals superimposable on the above described video signals.

Thereby, the video signals of the part to be inspected or the like superimposed with the patient ID and others shown by the reference numeral 960 in FIG. 2 from the above mentioned image synthesizing circuits 943R, 943G and 943B and the SYNC (synchronizing signal) generated in the above mentioned synchronizing signal generating circuit 945 by the control signal of the above mentioned control signal generating part 944 are output to the monitor 915 and are also output to a connector 948J so as to be able to be led out.

A connector 948P is connected to the above mentioned connector 948J and the video signals of the part to be inspected superimposed with the patient ID and others which are the output signals of the above described image synthesizing circuits 943R, 943G and 943B and the SYNC (synchronizing signal) generated by the above mentioned synchronizing signal generating part 945 are output to the above mentioned image file controller 922 by the signal line 920 connected to the above mentioned connector 948P.

The patient ID and others input from the above mentioned keyboard 917 are input also to the character code transmitting circuit 950 so as to be converted to information exchanging codes provided by JIS C 9220 and others and to be output by a physical interface provided, for example, by RS-232C and a peculiar protocol (communication procedure) so as to be able to be led out to a connector 949J.

The signal line 926 is connected to the above mentioned connector 949J by a connector 949P and is connected to the above mentioned image file controller 922 so that such information exchanging codes as of the above mentioned patient ID and others may be output to the image file controller 922.

Further, the release switch 947 is also connected to the above mentioned character code transmitting circuit 950 and is operated as required by the endoscope system operator so that the above mentioned character code transmitting circuit 950 may output the controlling information exchanging codes to the above mentioned image file controller 922 so as to record the now input image in the still image file 924.

Thereby, the above mentioned image file controller 922 records such patient data as the patient ID and others input as described above and the image signal input as described above in the above mentioned still image file 924.

However, in the endoscope system which is an example of the above described video instrument, there is a problem that not only the cable for transmitting the video signal but also the cable for transmitting the information exchanging code is required and must be arranged.

Further, there is a problem that, in order to transmit the information exchanging code, both instruments must coincide with each other in the physical interface and protocol (communication procedure).

Also, speaking of the image input apparatus, there is a problem that some instrument can output the image but can not output the information exchanging code.

Therefore, in the publication of a Japanese patent application laid open No.60071/1989, there is suggested an imaging system wherein a control signal of an imaging part is superimposed on a synchronizing signal and a state signal of the imaging part is superimposed on a video signal by a frequency multiplex means or the like so as to be transmitted.

However, in the above described system, there are problems that the frequency multiplex means for superimposing the control signal on the synchronizing signal and superimposing the state signal on the video signal is required for each instrument and the imaging system can not be adapted to an instrument which can not output the information exchanging code.

OBJECT AND SUMMARY OF THE INVENTION

An object of the present invention is to provide a medical instrument interfacing apparatus wherein no cable for transmitting an information exchanging code is required, both instruments are not required to coincide with each other in the physical interface and protocol (communication procedure), the information can be exchanged even in an instrument which can not output an information exchanging code and at least one instrument is not required to be provided with such special means as a frequency multiplex means.

The medical instrument interfacing apparatus of the present invention comprises an imaging instrument provided with a video signal generating means, device signal generating means for generating a device signal and superimposing means for superimposing the above mentioned device signal on the above mentioned video signal and an outside instrument provided with a video signal transmitting means for transmitting a video signal from the above mentioned video instrument to the outside instrument, extracting means for extracting the above mentioned device signal from the video signal from the above mentioned video signal transmitting means and recovering at least one of the data and outside instrument controlling information and controlled instrument.

The other features and advantages of the present invention will become apparent enough with the following explanation.

BRIEF DESCRIPTION OF THE DRAWINGS

FIGS. 1 to 3 relate to related art examples.

FIG. 1 is a formation view of an endoscope system.

FIG. 2 is an explanatory view of an image of the endoscope system.

FIG. 3 is a formation view of an image input apparatus.

FIGS. 4 to 11 relate to the first embodiment of the present invention.

FIG. 4 is an explanatory view of a whole system including a medical instrument interfacing apparatus.

FIG. 5 is a formation view of an endoscope system.

FIG. 6 is a formation view of an image input apparatus.

FIG. 7 is a formation view of an ultrasonic endoscope system.

FIG. 9 is a formation view of an image filing apparatus.

FIG. 10 is an explanatory view of a recording format of the image filing apparatus.

FIG. 11 is an explanatory view of an image extracting method.

FIG. 12 is a formation view of an endoscope system.

FIG. 13 is a formation view of an image input apparatus.

FIGS. 14 to 18 relate to the third embodiment of the present invention.

FIG. 14 is an explanatory view of a whole system including a medical instrument interfacing apparatus.

FIG. 15 is a formation view of an endoscope system.

FIG. 16 is a formation view of an image input apparatus.

FIG. 17 is a formation view of an image filing apparatus.

FIG. 18(A) is an explanatory view of a first step image of the endoscope system.

FIG. 18(B) is an explanatory view of a second step image of the endoscope system.

FIG. 18(C) is an explanatory view of a third step image of the endoscope system.

FIG. 19 is a formation view of an endoscope system.

FIG. 20 is a formation view of an image input apparatus.

FIG. 21 is a formation view of a VTR controlling apparatus.

FIG. 22 is an explanatory view of an image of the endoscope system.

FIG. 23 is a formation view of a controlling apparatus.

FIG. 24 is an explanatory view of an endoscope system.

FIGS. 25 to 34 relate to a first modification of the third embodiment of the present invention.

FIG. 25 is a block diagram showing the formation of an image filing system.

FIG. 26 is a block diagram showing the schematic formation of the image filing system.

FIG. 27 is an explanatory view of an endoscope tip part.

FIG. 28 is a formation explaining view of a video processor apparatus.

FIG. 29 is a block diagram showing the formation of a host computer.

FIG. 30(A) is an explanatory view of a patient data file.

FIG. 30(B) is an explanatory view of an inspection data file.

FIG. 30(C) is an explanatory view of a disc data file.

FIG. 31 is a flow chart view representing an entire program.

FIG. 32 is an explanatory view of a main menu picture displayed on a monitor.

FIG. 33 is an explanatory view of an endoscope image displayed on the monitor. FIG. 34 is a flow chart view of a sub-routine of an endoscope inspection. FIG. 35 is a formation explaining view of an image filing system.

DETAILED DESCRIPTION OF THE PREFERRED EMBODIMENTS

In FIGS. 4 to 11 is shown the first embodiment of the present invention.

Figure 3:
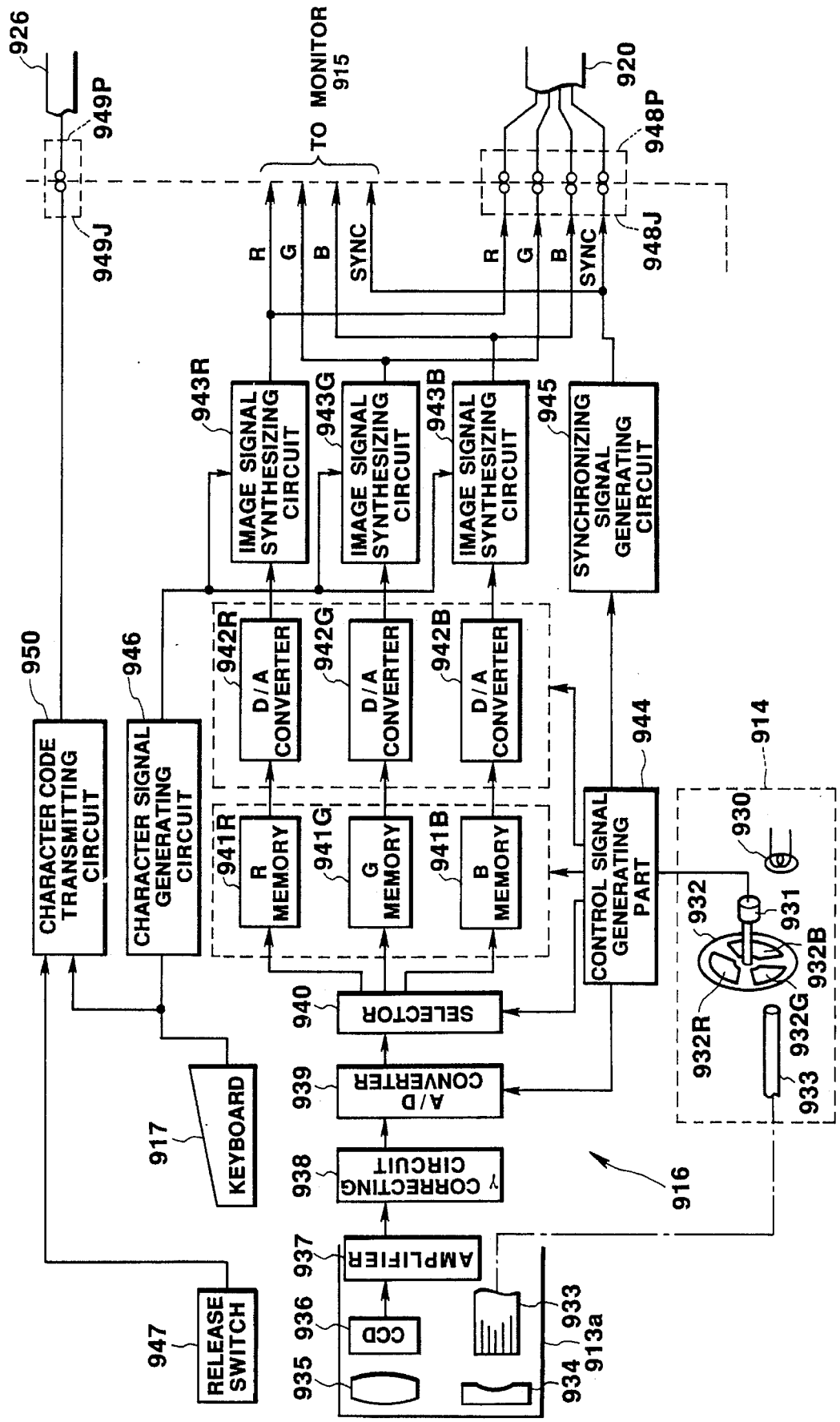
Figure 4:
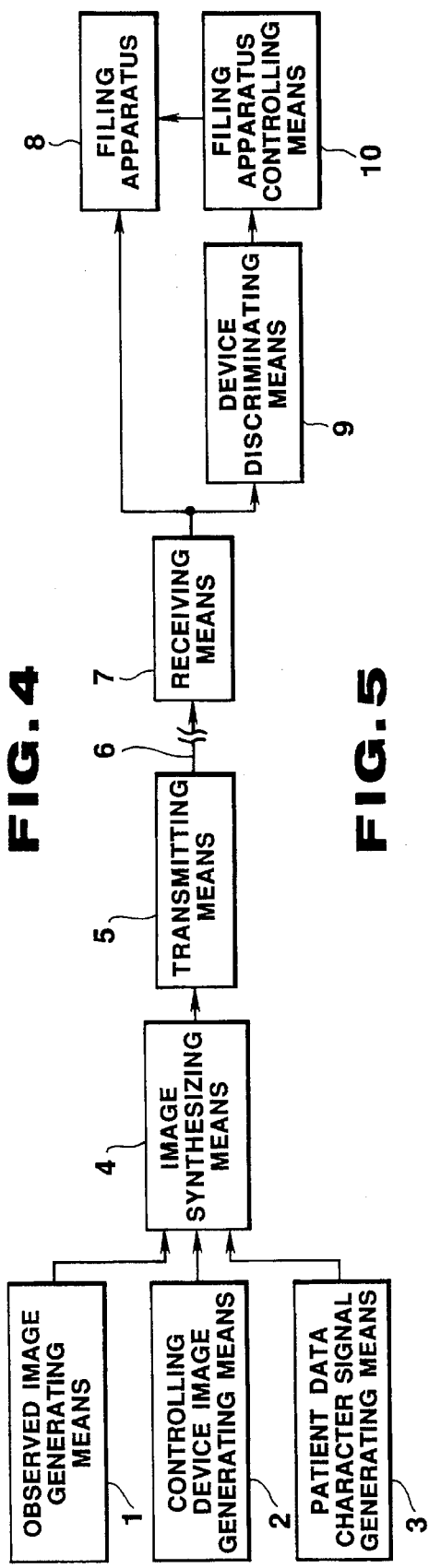

As shown in FIG. 4, the medical instrument interfacing apparatus comprises, for example, in a video instrument on the transmitting side, an observed image generating means 1 for generating an image signal which is an observed image, for example, by an endoscope, a controlling device signal generating means 2 for controlling the later described receiving end side, a patient data character signal generating means 3 for generating such character signal as an identification number (mentioned as a patient ID hereinafter) relating to a patient diagnosed, for example, with an endoscope, an image synthesizing means 4 for synthesizing into one video signal the image signal of the above described observed image generating means 1, device signal of the controlling device signal generating means 2 and character signal of the patient data character signal generating means 3, a signal transmitting means 5 for delivering to the receiving end side the image signal of this image synthesizing means 4, a video signal transmitting means 6 for transmitting with or without wires the output signal of this signal transmitting means 5 to the receiving end side, a signal receiving means 7 for receiving the output signal by the above mentioned signal transmitting means 5 transmitted by this video signal transmitting means 6, a filing apparatus 8 for recording in such large capacity recording medium as a photodisc or photomagnetic disc the image signal obtained by this signal receiving means 7, a device discriminating means 9 for extracting the device signal of the above described controlling device signal generating means 2 from the image signal obtained by the above described signal receiving means 7 and controlling a later described filing apparatus controlling means 10 and a filing apparatus controlling means 10 for controlling the above mentioned image filing apparatus 8 by the above described device signal.

The above mentioned image synthesizing means 4 is connected at the input end to the above mentioned observed image generating means 1, controlling device signal generating means 2 and patient data character signal generating means 3 and at the output end to the signal transmitting means 5 at the input end.

The above mentioned video signal transmitting means 6 is connected at one end to the above mentioned signal transmitting means 5 at the output end and at the output end to the signal receiving means 7 at the input end.

The above mentioned signal receiving means 7 is connected at the output end to the above mentioned filing apparatus 8 at the video signal input end and to the above mentioned device discriminating means 9 at the input end.

The above mentioned device signal discriminating means 9 is connected at the output end to the above mentioned filing apparatus controlling means 10 at the input end. This filing apparatus controlling means 10 is connected at the output end to the above mentioned image filing apparatus 8 at the control end.

Figure 5:
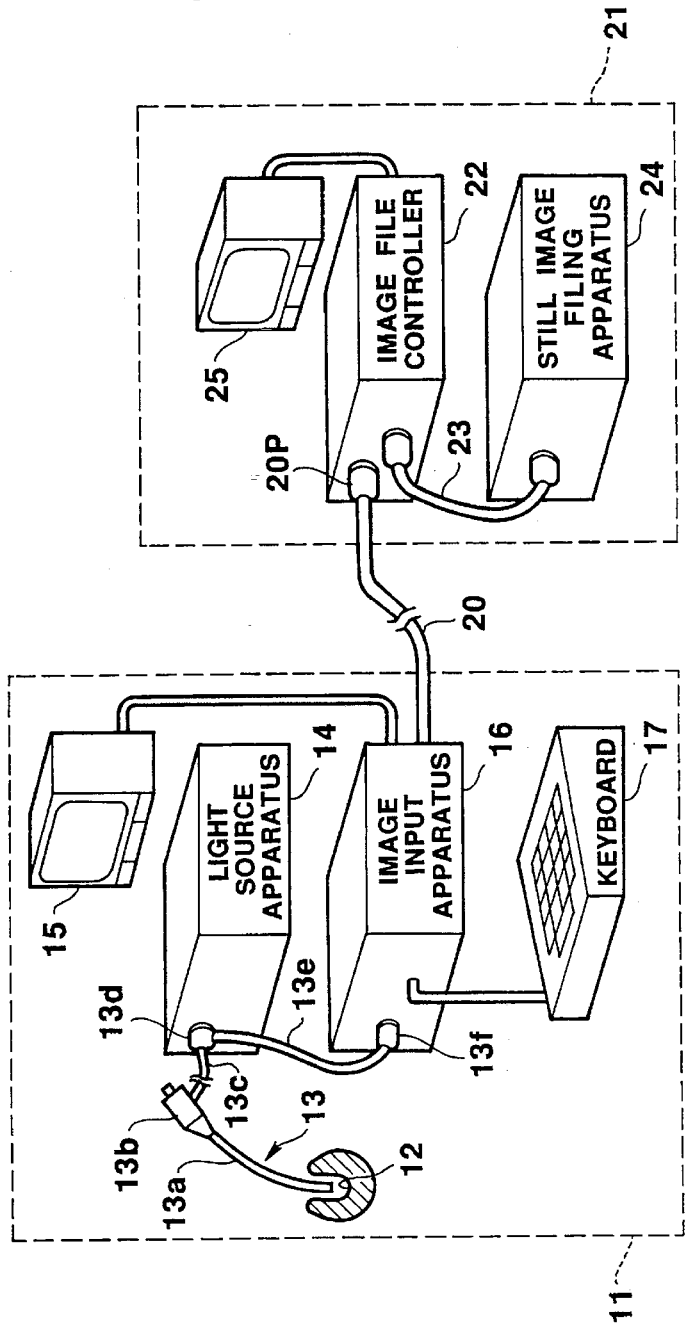

The formation of such concrete example of the above described medical instrument interfacing apparatus as an endoscope system shown, for example, in FIG. 5 shall be explained.

This endoscope system comprises an endoscope apparatus 11 and an image filing apparatus 21 connected with each other through a cable 20.

The above mentioned electronic endoscope apparatus 11 comprises an endoscope 13 to be inserted, for example, into a body cavity, a light source apparatus 14 feeding an illuminating light to the tip part of this endoscope 13, an image input apparatus 16 driving such imaging device as a solid state imaging device (CCD) provided, for example, on the tip surface of the above mentioned endoscope 12 and making such signal process as converting to a video signal the imaging signal photoelectrically converted by the above mentioned imaging device, a monitor 15 displaying the video signal from this image input apparatus 16 and a keyboard 17 for inputting the patient information and others. The above mentioned endoscope 13 is connected to the above mentioned light source apparatus 14. The above mentioned endoscope 13, monitor 15 and keyboard 17 are connected to the above mentioned image input apparatus 16.

The above mentioned endoscope 13 comprises, for example, an elongate flexible insertable part 13a, a thick operating part 13b connected to this insertable part 13a in the hand base side base part, a universal cord extended from the side of this operating part 13b, a connector 13d provided at the end of this universal cord, a signal line 13e extended from this connector 13d and a connector 13f provided at the end of this signal line 13e. The above mentioned connector 13d is connected to the above mentioned light source apparatus 14. The above mentioned connector 13f is connected to the above mentioned image input apparatus 16.

The above mentioned image filing apparatus 21 comprises an image file controller 22 controlling the respective devices of the image filing apparatus 21, a still image filing apparatus 24 recording the video signals in such large capacity recording medium as a photodisc or photomagnetic disc and a monitor 25 displaying the video signal from the above mentioned image file controller 22. The monitor 25 and still image filing apparatus 24 are connected to the above mentioned image file controller 22 through a signal line 23.

Figure 6:
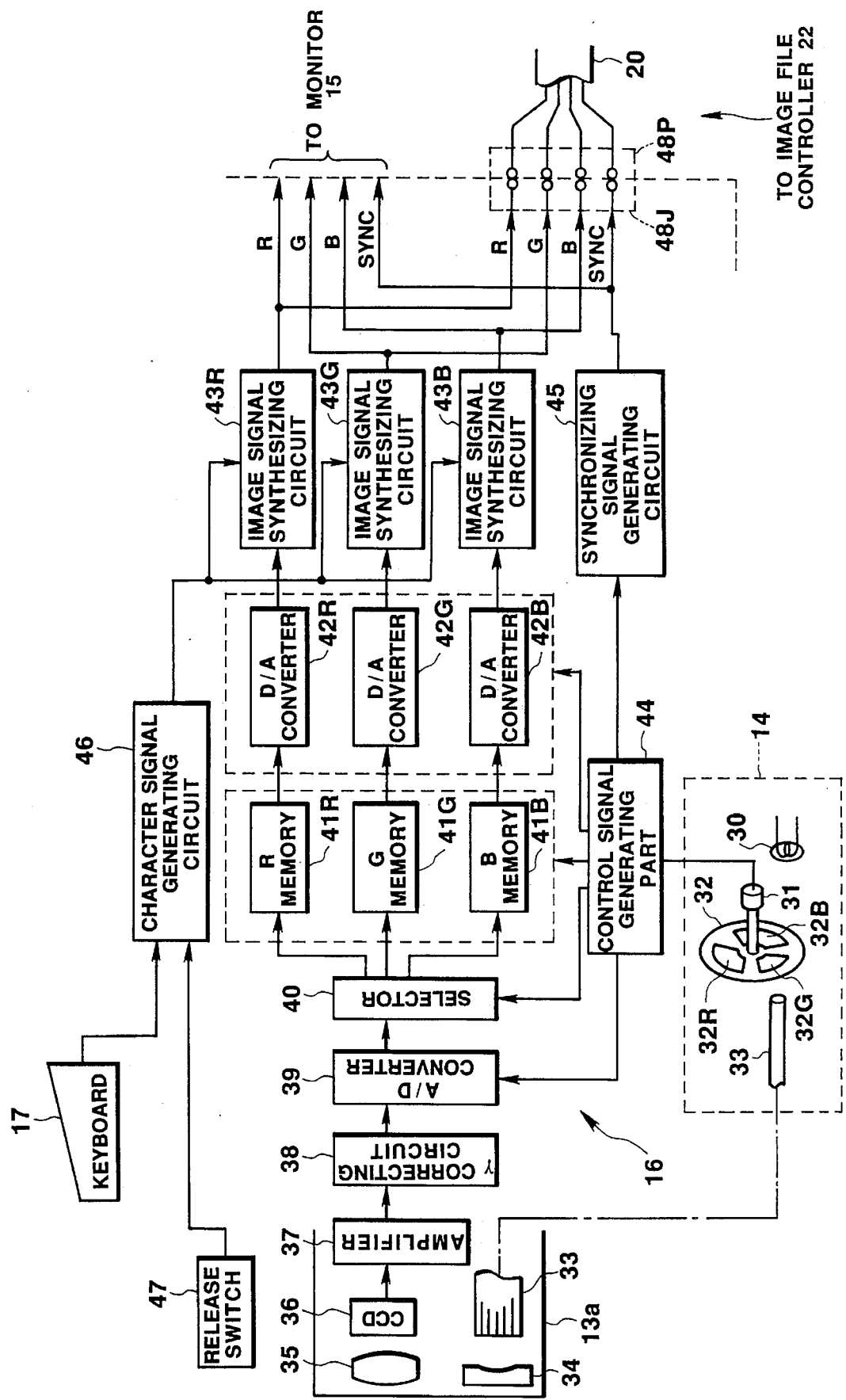

The above mentioned endoscope apparatus 11 is of the formation shown in FIG. 6.

The above mentioned light source apparatus 14 is provided with a lamp 30 generating a white color light, a rotary color filter 32 provided with filters 32R, 32G and 32B separating this white color light respectively into R(red), G(green) and B(blue) and a motor 31 rotating and driving this rotary color filter 32 so that the illuminating lights separated into the wavelength regions of R, G and B by the above mentioned rotary color filter 32 may be fed to the entrance end surface of a light guide 33.

In the tip part 13a of the above mentioned endoscope 13 are arranged the exit end surface of the above mentioned light guide 33, a light distributing lens 34, an objective lens 35 and a CCD 36 which is a solid state imaging device so that the illuminating lights led by the above mentioned light guide 33 may be radiated into a body cavity by the light distributing lens 34 and the object beam by the reflection of these illuminating lights may be made to form an image on the imaging surface of the CCD 36 by the objective lens 35.

Further, a release switch 47 is provided, for example, in the operating part 13b of the above mentioned endoscope 13 and is connected to the character signal generating circuit 46 of the later described image input apparatus 16.

The above mentioned image input apparatus 16 is provided with an amplifier 37 connected to the above mentioned CCD 36, a γ correcting circuit 38 connected to this amplifier 37, an A/D converter 39 connected to this γ correcting circuit 38, a selector 40 connected to this A/D converter 39, an R memory 41R, G memory 41G and B memory 41B connected to this selector 40, D/A converters 42R, 42G and 42B connected respectively to these R memory 41R, G memory 41G and B memory 41B, image signal synthesizing circuits 43R, 43G and 43B connected respectively to these D/A converters 42R, 42G and 42B and connected to a later described character signal generating circuit 46, a connector 48J connected to the above mentioned image synthesizing circuits 43R, 43G and 43B, a control signal generating part 44 connected to the above mentioned A/D converters 39, selector 40, R memory 41R, G memory 41G, B memory 41B, D/A converters 42R, 42G and 42B and a later described synchronizing signal generating circuit 45, the above mentioned synchronizing signal generating circuit 45 and a character signal generating circuit 46 connected to a later described keyboard 17 and the above mentioned release switch 47.

The above mentioned keyboard 17 is connected to the character signal generating circuit 46 of the above mentioned image input apparatus 16.

Figure 9:
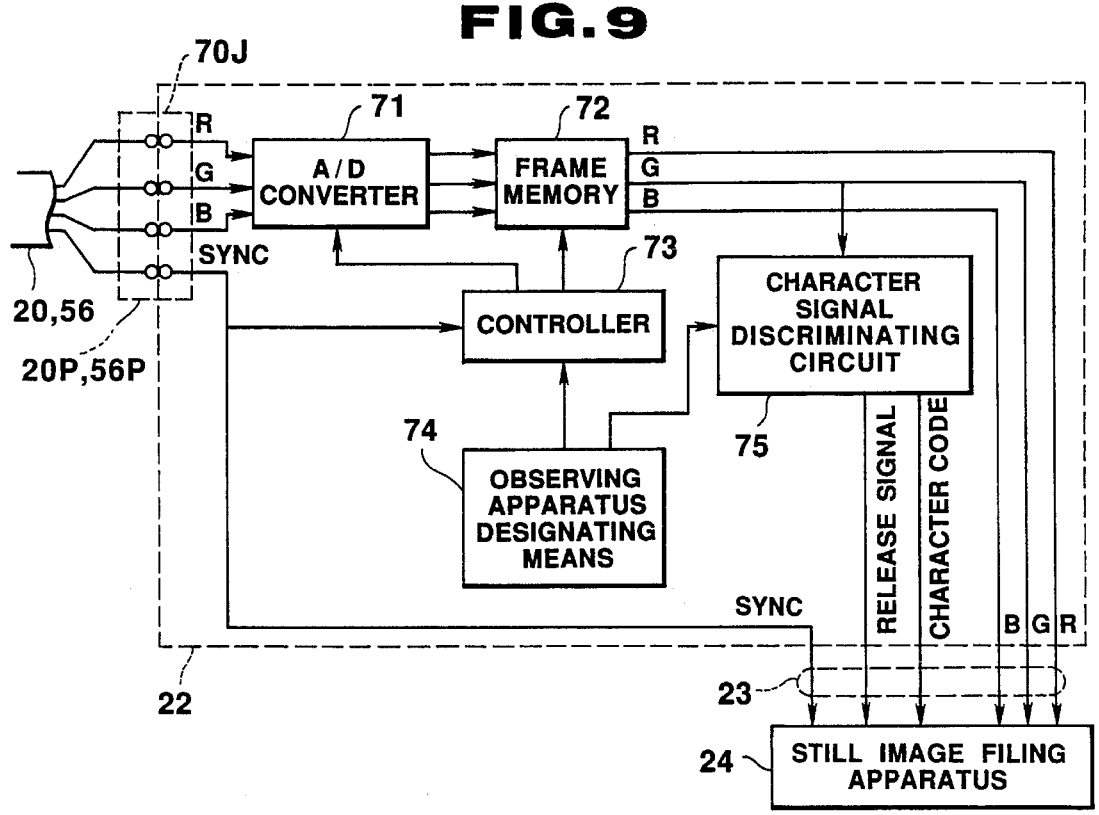

As shown in FIG. 9, the above mentioned image filing apparatus 21 comprises a connector 70J to which a connector 20P provided at the end of the above mentioned cable 20 or a connector 56P provided at the end of a later described cable 56 can be removably connected, an A/D converter 71 connected at the input end to the R, G and B video signal lines of this connector 70J, a frame memory 72 connected at the input end to this A/D converter 71, a controller 73 connected at the input end to the above mentioned connector 70J at the SYNC (synchronizing signal) end, connected at the output end to the above mentioned A/D converter 71 and frame memory 72 and controlling the above mentioned respective blocks, an observing apparatus designating means 74 which is, for example, a switch connected at the output end to the above mentioned controller 73 and a later described character signal discriminating means 75 and designating an observing apparatus to be connected to the connector 70, a character signal discriminating means 75 connected to the above mentioned frame memory 72 at the G signal output end, discriminating the character/device of the video signal by the G signal and outputting a release signal and information exchanging code (mentioned as a character code hereinafter) to a still image filing apparatus 24 by a later described signal line 23, a cable 23 connected on one hand to the above mentioned frame memory 72 at the R, G and B signal output ends, the above mentioned character signal discriminating circuit 75 at the character code output end and release signal output end and the above mentioned connector 70J at the SYNC end and on the other hand to the above mentioned still image filing apparatus 24 and a still image filing apparatus 24 recording the input character code and R, G and B image signals in such large capacity recording medium as a photodisc or photomagnetic disc.

Figure 7:
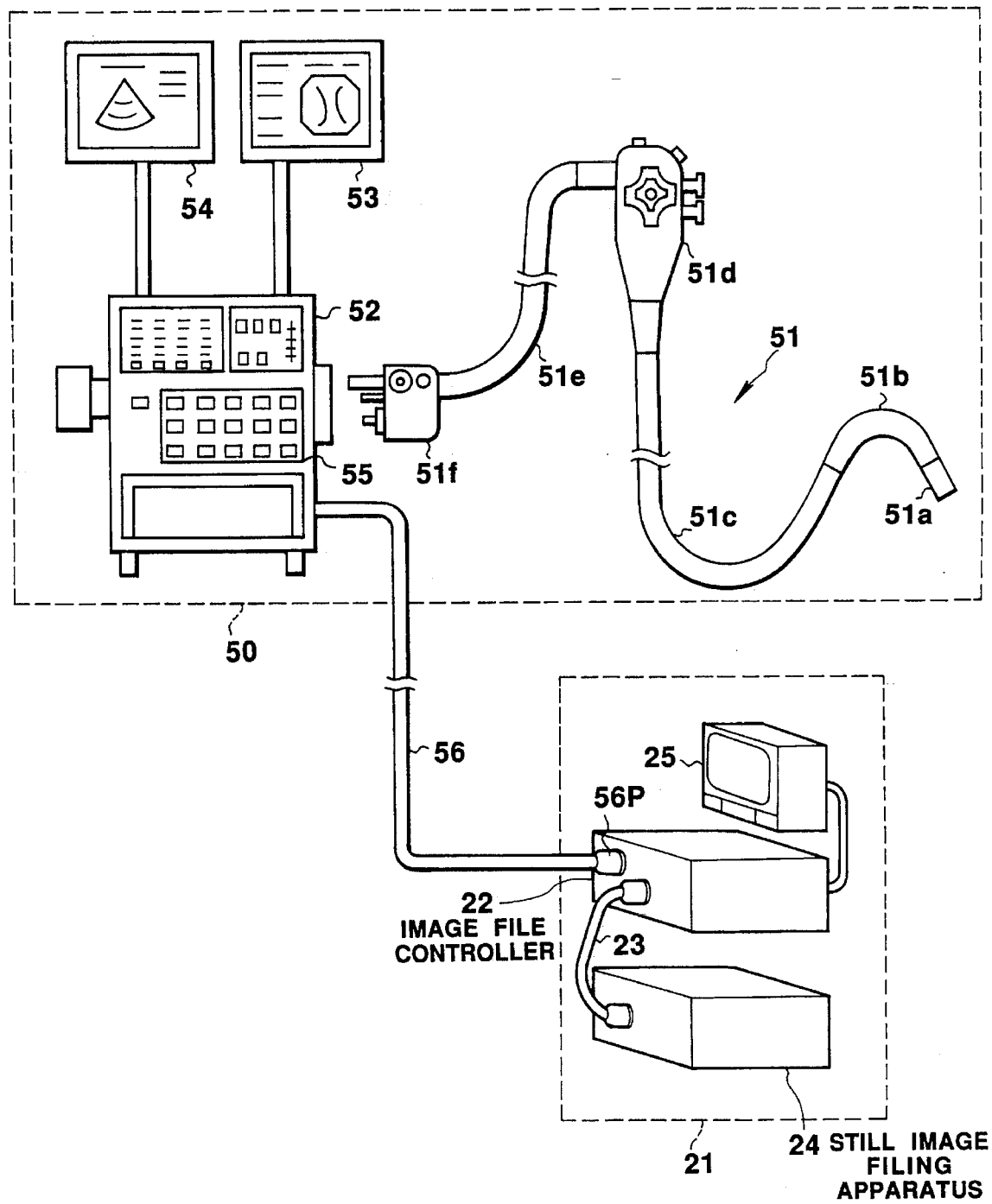

The formation of such concrete example of the above described medical instrument interfacing apparatus as an ultrasonic endoscope system shown, for example, in FIG. 7 shall be explained.

The ultrasonic endoscope system comprises an ultrasonic endoscope apparatus 50 and the above mentioned image filing apparatus 21 connected with each other through a cable 56. By the way, the explanation of the above described image filing apparatus 21 shall be omitted.

The above mentioned ultrasonic endoscope apparatus 50 comprises an ultrasonic endoscope 51 having an ultrasonic probe to be inserted, for example, into a body cavity and a function of an electronic endoscope, an ultrasonic diagnosing apparatus 52 provided with a light source part feeding an illuminating light to the tip part of this ultrasonic endoscope 51, an image input part driving such imaging device as a solid state imaging device (CCD) provided, for example, on the tip surface of the above mentioned ultrasonic endoscope 51 and performing such signal process as converting to a video signal the imaging signal photoelectrically converted by the imaging device, an ultrasonic diagnosing part driving a probe arranged, for example, on the tip surface of the above mentioned ultrasonic endoscope 51 and performing an ultrasonic observation and a keyboard 55 for inputting the patient information and others, a monitor 53 displaying the video signal of the endoscope observation from this ultrasonic diagnosing apparatus 52 and a monitor 54 displaying the video signal of the ultrasonic observation from this ultrasonic diagnosing apparatus 52. The above mentioned ultrasonic endoscope 51 is to be connected to the above mentioned ultrasonic diagnosing apparatus 52.

The above mentioned ultrasonic endoscope 51 comprises a tip part 51a internally provided with an ultrasonic probe and solid state imaging device, a curvable part 51 connected to this tip part 51a at the rear end and curvable, for example, vertically and horizontally, a flexible tube part 51c, for example, elongate and flexible and connected to this curvable part 51b at the rear end, a thick operating part 51d connected to this flexible tube part 51c in the hand base side base, a universal cord 51e extended from the side of this operating part 51d and a connector 51f provided at the end of this universal cord 51e. The above mentioned connector 51f is to be connected to the above mentioned ultrasonic diagnosing apparatus 52.

The operation of the system including the thus formed medical instrument interfacing apparatus shall be explained by using the endoscope system. By the way, on the ultrasonic endoscope system, only the video signal shall be explained.

As shown in FIG. 6, in the above described endoscope system, the light source of the lamp 30 provided within the light source apparatus 14 is separated into R, G and B by the filters 32R, 32G and 32B of the rotary color filter 32 rotated by the motor 31 rotated and driven by the synchronizing signal from the control signal generating part 44 of the image input apparatus 16 and is radiated to the entrance end surface of the light guide 33.

The lights separated into R, G and B as described above are led through the above mentioned light guide 33, are emitted from the exit end surface and are radiated to a part to be inspected not illustrated by the light distributing lens 34.

The object beam by the above described R, G and B illuminating lights is made to form an image on the photoelectric converting surface of the CCD by the objective lens 35.

The above mentioned CCD 36 is driven by a signal line not illustrated to convert the object beam having formed the image on the photoelectric converting surface to an imaging signal to be output to the amplifier 37.

The above mentioned amplifier 37 properly amplifies the input imaging signal and outputs it to the γ correcting circuit 38. 38, for example, the imaging signal has γ corrected, is converted to a video signal and is output to the A/D converter 39.

In the above mentioned A/D converter 39, the video signal which is an analogue signal is converted to a digital signal by the control signal of the above mentioned control signal generating part 44 and is output to the selector 40.

In the above mentioned selector 40, the output of the above mentioned A/D converter 39 is switched to the R memory 41R, G memory 41G and B memory 41B by the control of the above mentioned control signal generating part 44 and is output. This switching is equal to the wavelength regions R, G and B of the illuminating light radiated to the above described object, For example, in case the illuminating light is R, the output will be to the R memory 41R.

The video signals memorized in the above mentioned R memory 41R, G memory 41G and B memory 41B are simultaneously read out by the control of the above mentioned control signal generating part 44 and are output to the D/A converters 42R, 42G and 42B. That is to say, the video signal of the object beam input in time series in the wavelength regions of R, G and B will become a simultaneous image signal.

In the above mentioned D/A converters 42R, 42G and 42B, the input video signals which are digital signals are converted to analogue signals and are output to the image synthesizing circuits 43R, 43G and 43B.

Not only the above described video signals but also the signal from the character signal generating circuit 46 is input into the above mentioned image synthesizing circuits 43R, 43G and 43B.

In this character signal generating circuit 46, the identification number (mentioned as the patient ID hereinafter), name and others of the patient input from the keyboard 17 are output as signals superimposable on the above described video signals.

Figure 8A:
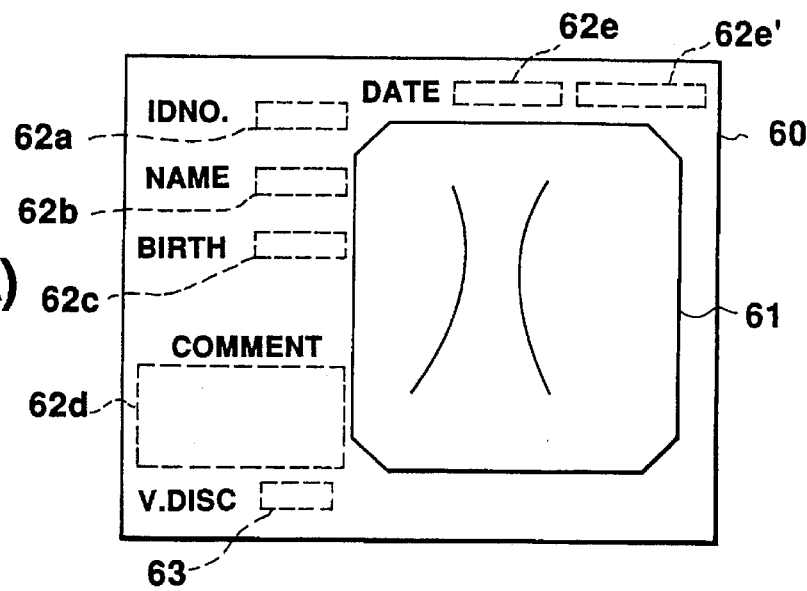
FIG. 8(A) is an explanatory view of an image of the endoscope system.

Thereby, the video signals in which the patient ID and others represented by the reference numerals 62a to 62e in FIG. 8(A) are superimposed on the video signals of the inspected part or the like from the above mentioned image synthesizing circuits 43R, 43G and 43B and the SYNC (synchronizing signal) generated in the above mentioned synchronizing signal generating circuit 45 by the control signal of the above mentioned control signal generating part 44 are output to the monitor 15 and are output to the connector 48J.

The connector 48P is connected to the above mentioned connector 48J so that the video signals in which the patient ID and others are superimposed on the video signals of the inspected part or the like which are output signals of the above described image synthesizing circuits 43R, 43G and 43B and the SYNC (synchronizing signal) generated by the above mentioned synchronizing signal generating circuit 45 may be output to the above mentioned image file controller 22 by the signal line 20 connected to the above mentioned connector 48P.

Further, the release switch 47 is connected to the above mentioned character signal generating circuit 46 and is operated as required by the endoscope system operator so that the above mentioned character signal generating circuit 46 may output a device control signal to superimpose a character, for example, of "REC" in the part represented by the reference numeral 63 in FIG. 8(A) on the video signals of the inspected part or the like from the above mentioned image synthesizing circuits 43R, 43G and 43B.

In the above mentioned image filing apparatus 21, as shown in FIG. 9, the R, G and B video signals and SYNC (synchronizing signal) from the endoscope apparatus 11 can be input by the connector 56P provided at the end of the cable 56 or the video signals and SYNC (synchronizing signal) from the ultrasonic endoscope apparatus 50 can be input by the connector 56P provided at the end of the cable 56.

Thereby, the video signals which are analogue signals input into the A/D converter 71 through the connector 70J are converted to digital signals and are memorized in the frame memory 72. The A/D converter 71 and frame memory 72 are controlled by the controller 73 generating a control signal by the SYNC (synchronizing signal) input through the connector 70J.

The information relating to the observing apparatus is input into the above mentioned controller 73 from the observing apparatus designating means 74 so that the controller 73 may judge the image signal read out of the frame memory 72 and control the above mentioned frame memory 72.

This operation shall be explained in detail with reference to FIG. 8.

Figure 8B:
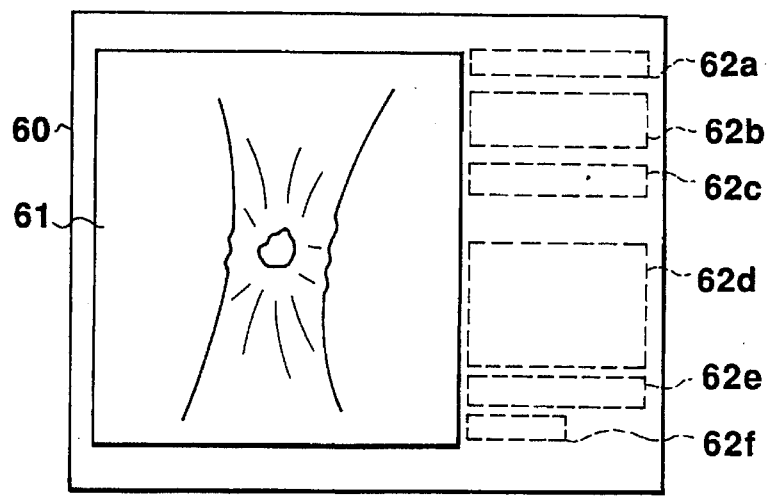
FIG. 8(B) is an explanatory view of an image of another endoscope system.
Figure 8C:
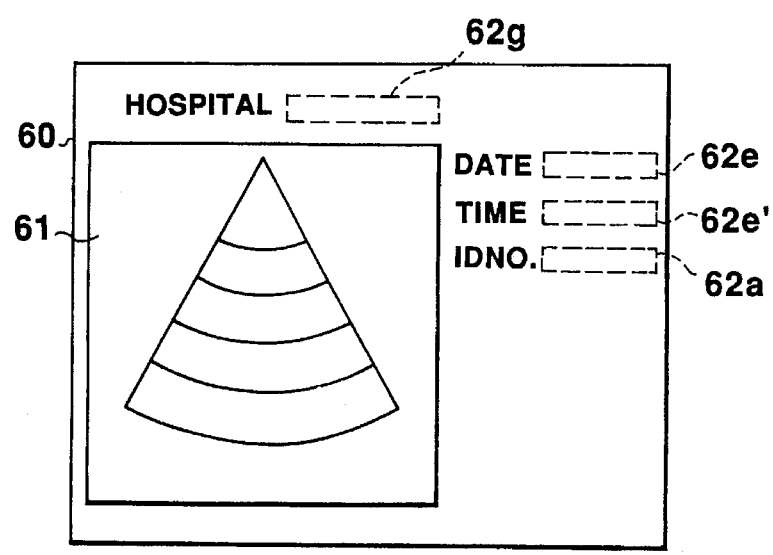
FIG. 8(C) is an explanatory view of an image of an ultrasonic endoscope system.

FIG. 8(A) is of a video signal from the endoscope apparatus 11. FIG. 8(B) is of an example of the video signal from another endoscope apparatus. FIG. 8(C) is of a displayed video signal from the ultrasonic endoscope apparatus 50.

In FIGS. 8(A) to (C), the reference numeral 60 represents a video image displayed in the monitor 25 of the above mentioned image filing apparatus 21, the reference numeral 61 represents a video image of the inspected part obtained by the endoscope or ultrasonic probe and the reference numerals 62a to 62g represent such character information as the patient ID and others synthesized as described above. However, the above described character information is memorized as a pattern information which is a collection of points in the frame memory 72.

The above described reference numerals 62a to 62g shall be explained in detail. For example, the reference numeral 62a represents a patient ID, the reference numeral 62b represents a patient name, the reference numeral 62c represents a date of birth, the reference numeral 62d represents a comment space, the reference numeral 62e represents a diagnosis (observation) date, the reference numeral 62e' represents a diagnosis (observation) time, the reference numeral 62f represents a number of record (imaging) sheets and the reference numeral 62g represents a hospital name.

The character of "REC" superimposed on the video signal by the image input apparatus 16 of the endoscope apparatus 11 as described above is displayed in the part shown by the reference numeral 63 in FIG. 8(A).

Now, the video signals of the video images shown, for example, in FIGS. 8(A) to (C) as described above are input into the above mentioned image filing apparatus 22 and are memorized in the frame memory 72.

Also, an observing apparatus discriminating signal showing what observing apparatus is connected to the connector 70J is output to the controller 73 and character signal discriminating means 75 from the above mentioned observing apparatus designating means 74.

Figure 11:
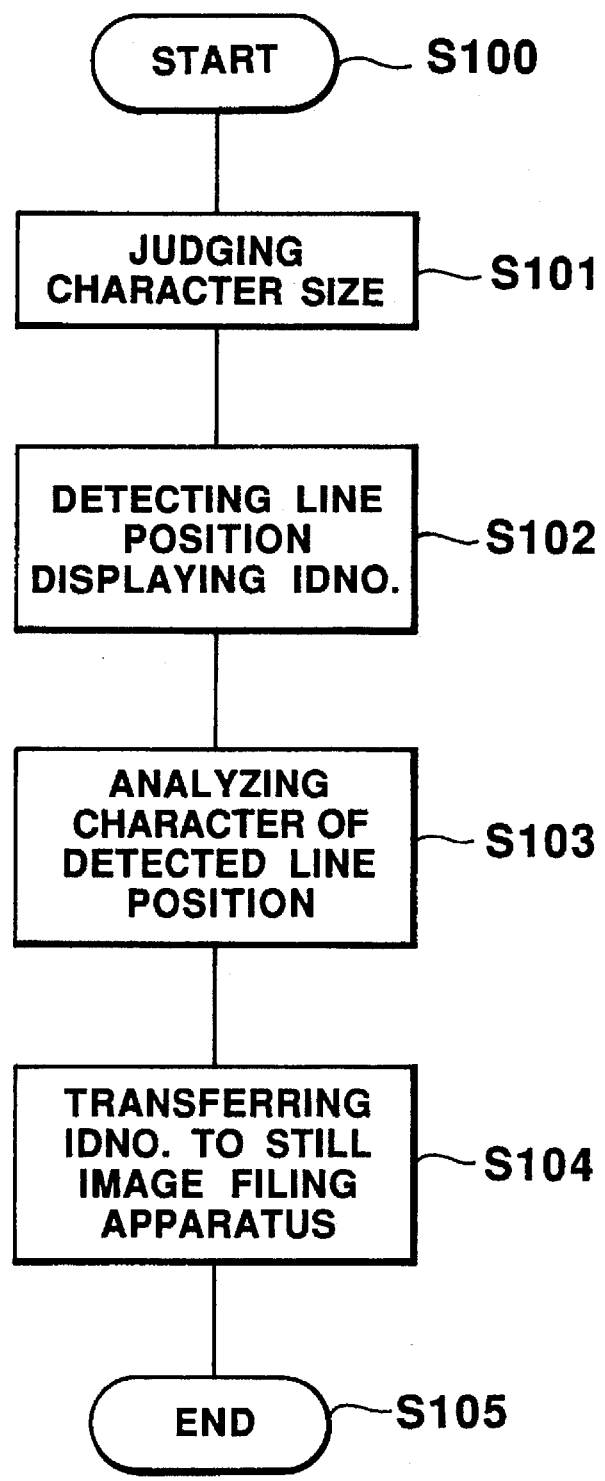

An example of the method of discriminating the character of the above mentioned character signal discriminating circuit 75 shall be explained with reference to FIG. 11 in which the discrimination of the character on the patient ID shall be explained.

First of all, the discrimination of the character is started by a step (mentioned as S hereinafter) 100.

Then, in S101, as described above, the size of the character of the observing apparatus is judged by the observing apparatus discriminating signal from the observing apparatus designating means 74. At the same time, the controller 73 outputs the image information of the patient ID shown by the reference numeral 62a of the connected observing apparatus by the observing apparatus discriminating signal from the observing apparatus designating means 74 as described above.

Also, in S102, the position in which the patient ID (ID No.) is displayed on the observing apparatus is recognized by the observing apparatus discriminating signal from the observing apparatus designating means 74 as described above.

In S103, the character code represented by the collection of points is analyzed by the line position in which the size of the character by the above described S101 and the character by S102 are displayed. For this analysis of the character code is used, for example, a recognizing method by using feature points as mentioned on pages 80 to 85 of "Computer Image Process" published by Sampo Publishing Company, Japan, a recognizing method by using a peripheral distribution or a recognizing method by a pattern matching.

The character code recognized as described above is transferred to the still image filing apparatus 24 by S104 and this process ends in S105.

The transfer of the character codes of the above described reference numerals 62a to 62g is started in case a control character (i. e., device control information) for recording "REC" or the like in the above described reference numeral 63 is displayed. The character code displayed in this reference numeral 63 can be analyzed the same as by the above described method of discriminating the character of the patient ID.

As described above, to the still image filing apparatus 24, the character code is transferred and then the image data of the observed image are transferred. In this transfer, as described above, the controller 73 discriminates the observed image position of the observing apparatus by the observing apparatus discriminating signal from the observing apparatus designating means 74 so that only the image data of the observed image may be transferred.

Figure 10:
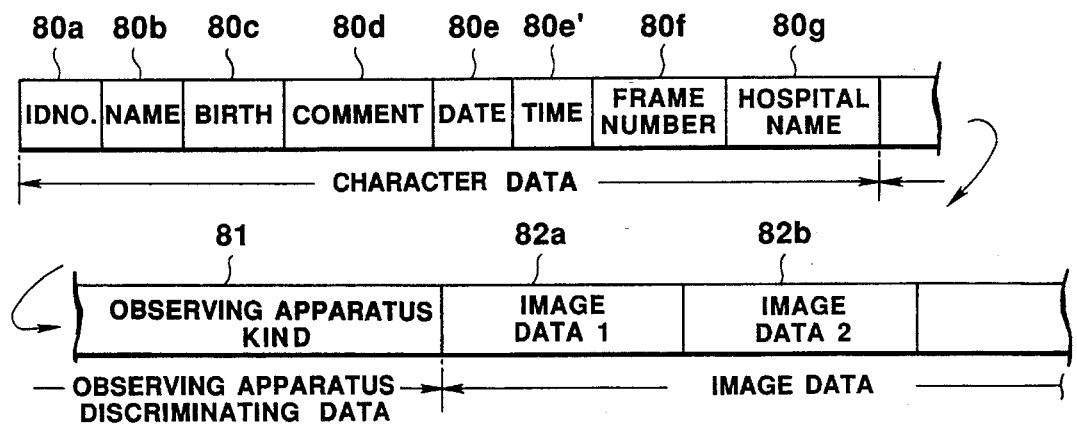

The recording format of the data recorded in the recording medium by the above mentioned still image filing apparatus 24 shall be explained with reference to FIG. 10.

As described above, the patient ID and others converted to character codes by the discriminating circuit 75 are recorded as character data in the reference numerals 80a to 80g, the observing apparatus discriminating data showing the observing apparatus kind are recorded in the rear as shown by the reference numeral 81 and the above described image data 1, 2, ... and n are recorded in the rear as shown by the reference numerals 82a, 82b ...

The above described reference numerals 80a to 80g shall be explained in detail. For example, the reference numeral 80a represents a patient ID (ID No.), the reference numeral 80b represents a patient name, the reference numeral 80c represents a date of birth, the reference numeral 80d represents a comment space, the reference numeral 80e represents a diagnosis (observation) date, the reference numeral 80e' represents a diagnosis (observation) time, the reference numeral 80f represents a number of record (imaging) sheets (number of frames) and the reference numeral 80g represents a hospital name.

As the character data and image data are recorded as separated from each other as described above, as compared with the case that all the pictures displayed in the monitor are recorded as image data, the amount of data recorded in one image will be reduced and the number of image data recordable in one recording medium will increase.

Also, as the observing apparatus discriminating data showing the kind of the observing apparatus are recorded as described above, the character data and image data can be reproduced as synthesized by the same image format as in the observing apparatus.

As the character data are extracted from the image data and are restored to the character codes as described above, there are effects that the video signal may be only transmitted between the video instruments such as between the endoscope apparatus and image filing apparatus, the cable, for example, for the transmission may be only for the video signal and, in case the video image from the control device has a controlling character/device, even if the interface/ protocol (communication procedure) of the character code transmitting means is different, even in the video instrument having no function of transmitting character codes, the controlled instrument can be controlled.

Figure 12:
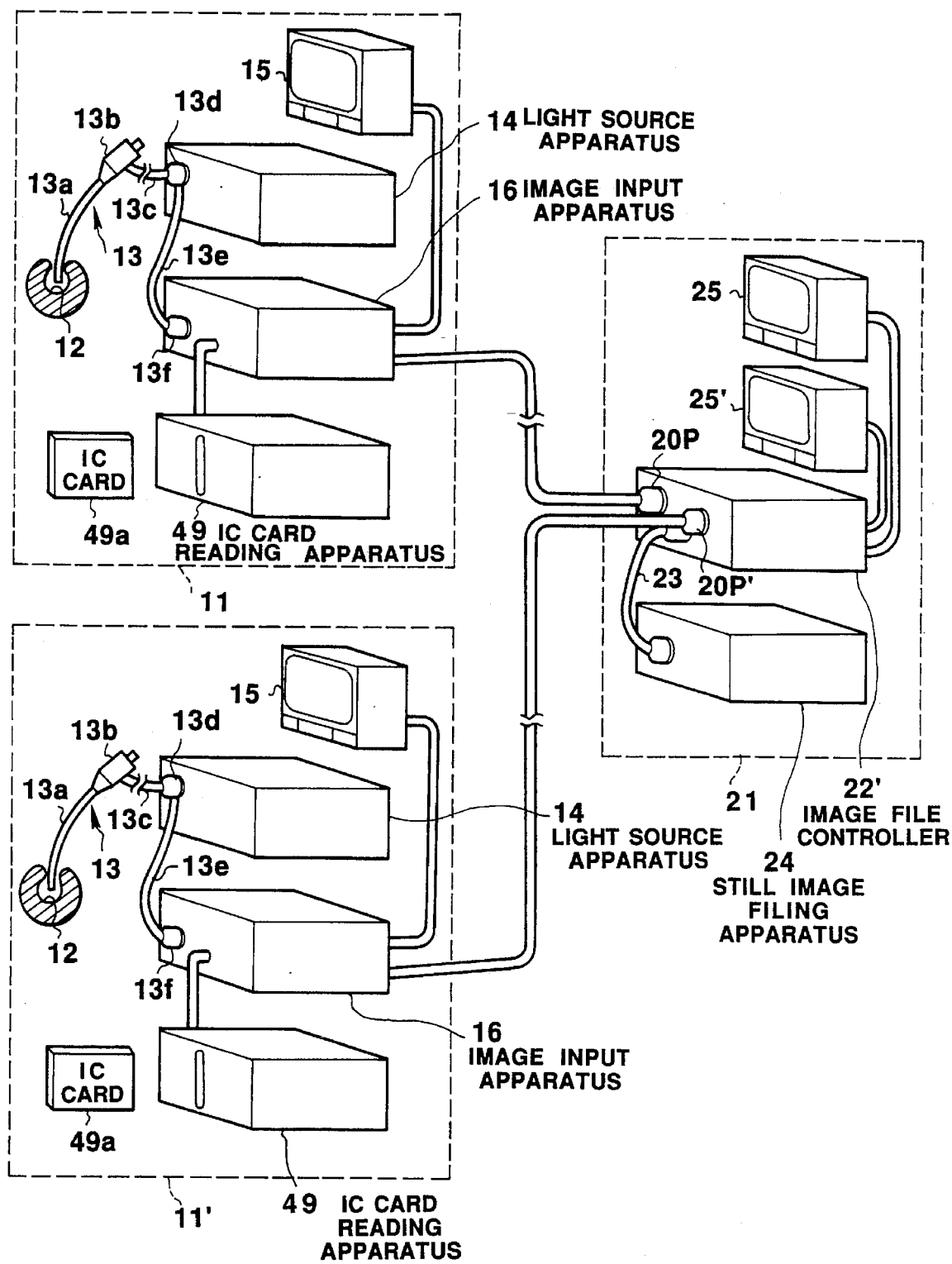
FIGS. 12 and 13 relate to the second embodiment of the present invention.
Figure 13:
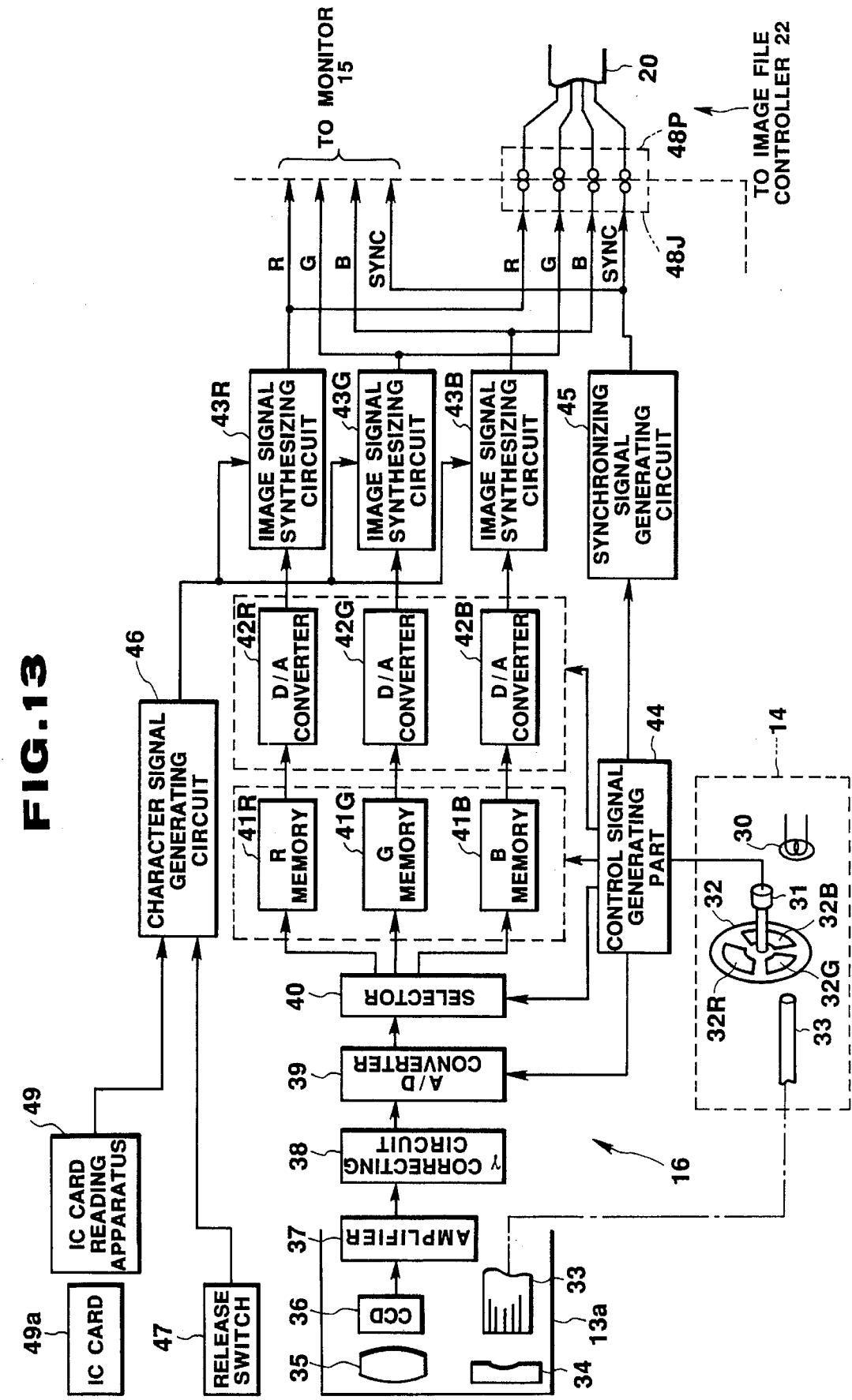

In FIGS. 12 and 13 is shown the second embodiment of the present invention. By the way, the same components as in the first embodiments shall bear the same reference numerals as in the first embodiment and shall not be explained here. The formation of the system including the medical instrument interfacing apparatus is the same as in the first embodiment.

As shown in FIG. 12, the endoscope system comprises endoscope apparatus 11 and 11' and an image filing apparatus 21.

An image input apparatus 16 of each of the above mentioned endoscope apparatus 11 and 11' is provided with an IC card reading apparatus 49 corresponding to IC cards used recently in medical organs in place of the keyboard 17 of the image input apparatus of the first embodiment and an IC card 49a can be inserted into this IC card reading apparatus 49.

Cables from the above mentioned endoscope apparatus 11 and 11' can be connected to an image file controller 22' respectively by connectors 20P and 20P'.

As shown in FIG. 13, instead of the keyboard 17 of the first embodiment, the IC card reading apparatus 49 is connected to the image input apparatus 16 so that patient data may be input from the IC card 49a inserted in this IC card reading apparatus 49.

Also, as shown in FIG. 12, the above mentioned image file controller 22' is provided with monitors 25 and 25' displaying the image signals corresponding to the above mentioned endoscope apparatus 11 and 11' so that the images of the endoscope apparatus 11 and 11' may be selected and recorded.

That is to say, there are effects that the patient data can be easily input by the IC card and the inputting time can be reduced.

The other formations, operations and effects are the same as in the first embodiment.

In FIGS. 14 to 18 is shown the third embodiment of the present invention. By the way, the same things as in the first and second embodiments shall bear the same reference numerals and shall not be explained here.

As shown in FIG. 14, for example, in the video instrument on the transmitting end side, the medical instrument interfacing apparatus comprises an observed image generating means 1, a controlling device signal generating means 2, a patient data character signal generating means 3 generating such character signal as, for example, a patient ID to be diagnosed with the endoscope by the character data of a later described patient data character discriminating means 92, a searching character signal generating means 93 generating such searching character signal as the patient ID, an image synthesizing means 94 synthesizing into one video signal the image signal of the above described observed image generating means 1, device signal of the controlling device signal generating means 2, character signal of the patient data character signal generating means 3 and character signal of the searching character signal generating means 93, a signal transmitting means 5 transmitting the image signal of this image synthesizing means 94 to the receiving end side, a video signal transmitting means 6 transmitting the output signal of this signal transmitting means 5 to the receiving end side, a signal receiving means 7 receiving the output signal by the above mentioned signal transmitting means 5 transmitted by this video signal transmitting means 6, a filing apparatus 8 recording the image signal obtained by this signal receiving means 7, a device discriminating means 9 extracting the device signal of the above described controlling device signal generating means 2 from the image signal obtained by the above described signal receiving means 7 and controlling a later described filing apparatus controlling means 10, a filing apparatus controlling means 10 controlling the above mentioned image filing apparatus 8 by the above described device signal, a signal transmitting means 90 transmitting the video signal of the above mentioned image filing apparatus 8 to the transmitting end side, a video signal transmitting means 91 transmitting the output signal of this signal transmitting means 90 to the transmitting end side, a signal receiving means 95 receiving the output signal by the above mentioned signal transmitting means 90 transmitted by this video signal transmitting means 91 and a patient data character discriminating means 92 extracting and restoring such character data as the patient ID from the image signal obtained by this signal receiving means 95.

The above mentioned image synthesizing means 94 is connected at the input end to the above mentioned observed image generating means 1, controlling device signal generating means 2, patient data character signal generating means 3 and searching character signal generating means 93 and at the output end to the signal transmitting means 5 at the input end.

The above mentioned video signal transmitting means 6 is connected at one end to the above mentioned signal transmitting means 5 at the output end and at the other end to the signal receiving means 7 at the input end.

The above mentioned signal receiving means 7 is connected at the output end to the above mentioned filing apparatus 8 at the video signal input end and to the above mentioned device discriminating means 9 at the input end.

The above mentioned device signal discriminating means 9 is connected at the output end to the above mentioned filing apparatus controlling means 10 at the input end. This filing apparatus controlling means 10 is connected at the output end to the above mentioned image filing apparatus 8 at the controlling end.

The above mentioned image filing apparatus 8 is connected at the video signal output end to the above mentioned signal transmitting circuit 90 at the input end.

The above mentioned video signal transmitting means 91 is connected at one end to the above mentioned signal transmitting means 90 at the output end and at the other end to the signal receiving means 7 at the input end.

Figure 15:
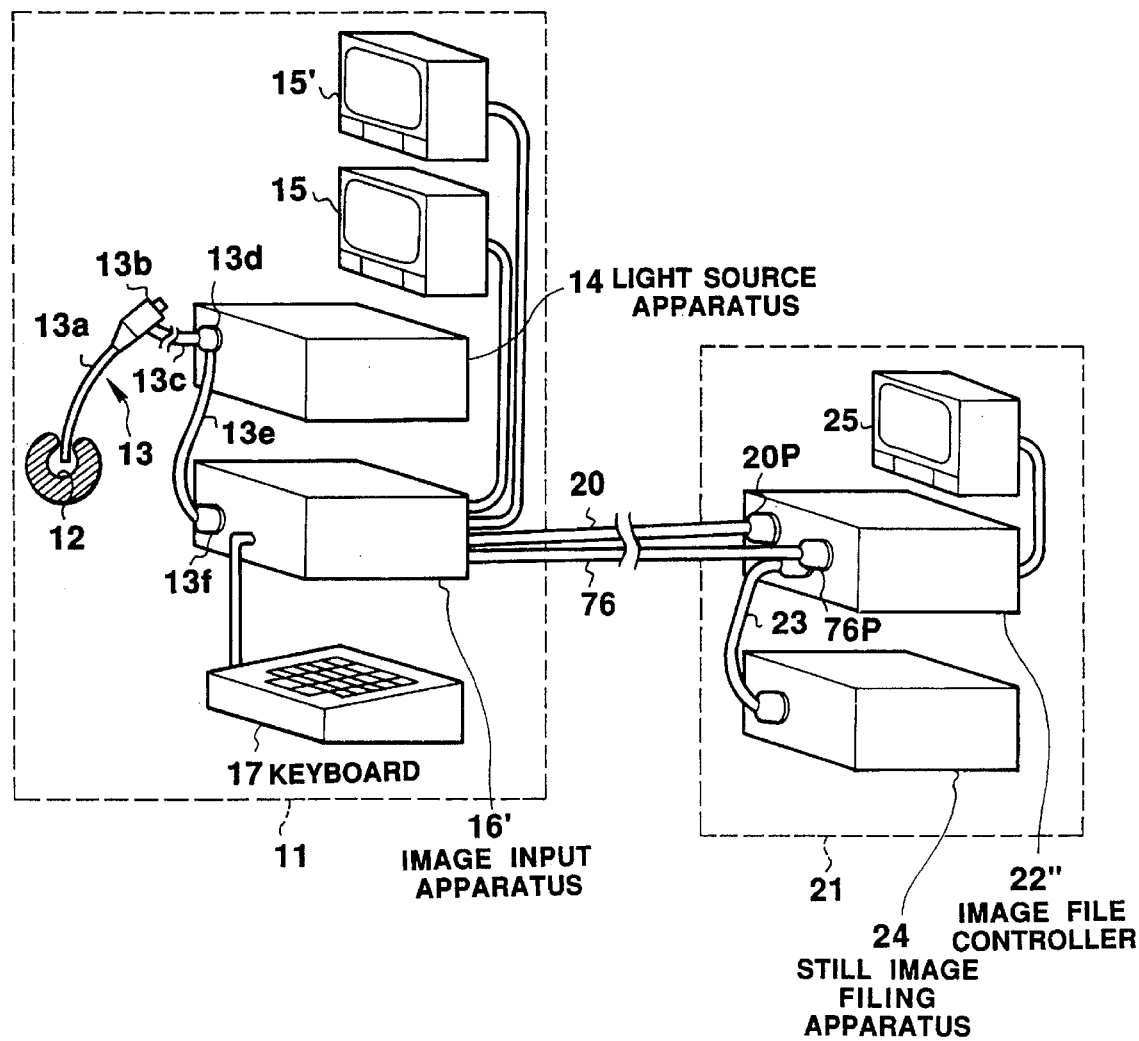

The formation of such concrete example of the above described medical instrument interfacing apparatus as an endoscope system shown, for example, in FIG. 15 shall be explained.

This endoscope system comprises an endoscope apparatus 11 and an image filing apparatus 21 connected with each other through cables 20 and 76.

The above mentioned electronic endoscope apparatus 11 comprises an endoscope 13, a light source apparatus 14, an image input apparatus 16' driving such imaging device as a solid state imaging device (CCD) provided, for example, on the tip surface of the above mentioned endoscope 13, converting to a video signal the imaging signal photoelectrically converted by the above mentioned imaging device and performing such signal process as obtaining such character data as a patient ID from a later described still image filing apparatus 22", monitors 15 and 15' displaying video signals from this image input apparatus 16' and a keyboard 17. The above mentioned endoscope 13 is connected to the above mentioned light source apparatus 14. The above mentioned endoscope 13, monitors 15 and 15' and keyboard 17 are connected to the above mentioned image input apparatus 16.

Figure 16:
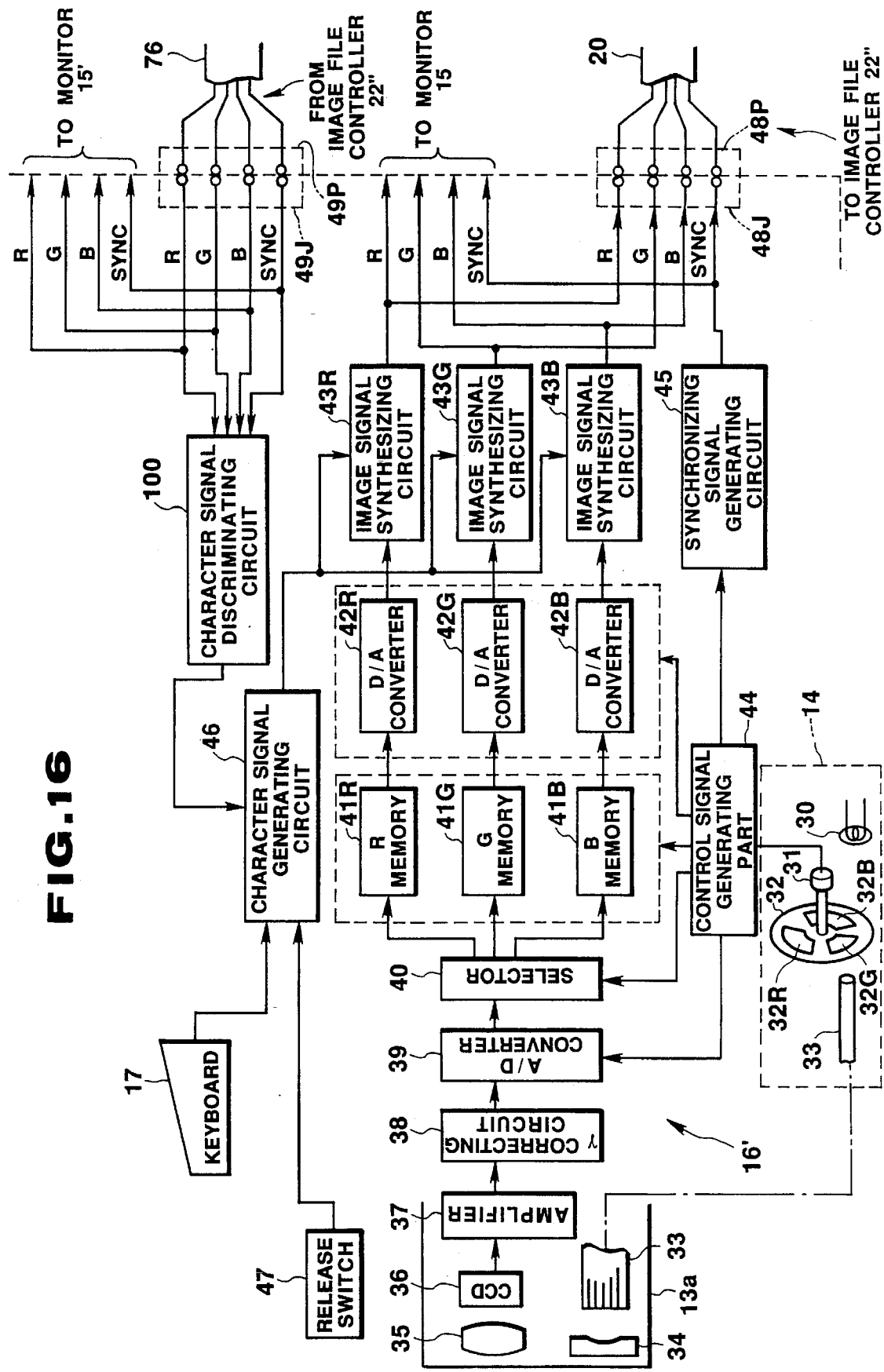

The above mentioned image filing apparatus 21 comprises an image file controller 22" controlling the respective devices of the image filing apparatus 21, a still image filing apparatus 24 recording video signals and others in a large capacity recording medium and a monitor 25 displaying the video signal from the above mentioned image file controller 22". The monitor 25 and the still image filing apparatus 24 through a signal line 23 are connected to the above mentioned image file controller 22". In the above mentioned electronic endoscope apparatus 11, as shown in FIG. 16, the endoscope apparatus of the first embodiment is provided with a character signal discriminating circuit 100 and a connector 49J for leading the image from the above mentioned image file controller 22" into this character signal discriminating circuit 100, the above mentioned connector 49J is connected to the above mentioned character signal discriminating circuit 100 at the input end and to the monitor 15', this character signal discriminating circuit 100 is connected at the output end to the character signal generating circuit 46 at the character data input end, a connector 49P is removably connected to the above mentioned connector 49J and a cable 76 is connected to this connector 49P and is connected to the above mentioned image file controller 22".

The other formations are the same as in the first embodiment and shall not be explained here.

Figure 17:
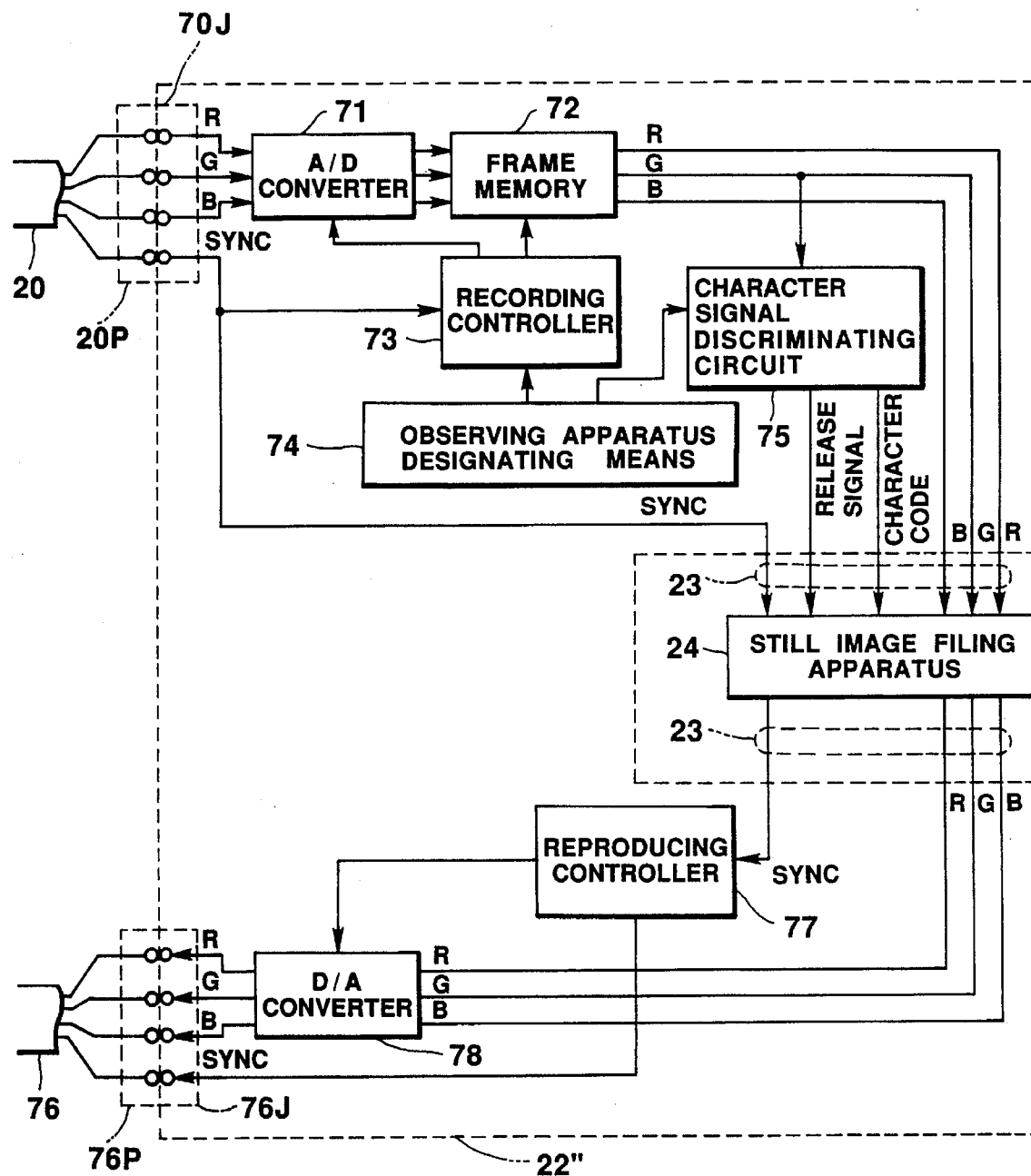

As shown in FIG. 17, the above mentioned image filing apparatus 21 comprises a connector 70J to which the connector 20P provided at the end of the above mentioned cable 20 can be removably connected, a connector 76P to which a connector 76P provided at the end of the above mentioned cable 76 can be removably connected, an A/D converter 71 connected at the input end to the R, G and B video signal lines of the above mentioned connector 70J, a frame memory 72 connected at the input end to this A/D converter 71, a controller (mentioned as the recording controller hereinafter) 73 connected at the input end to the above mentioned connector 70J at the SYNC (synchronizing signal) end and at the output end to the above mentioned A/D converter 71 and frame memory 72 and controlling the respective blocks, an observing apparatus designating means 74 which is, for example, a switch connected at the output end to the above mentioned recording controller 73 and a later described character signal discriminating means 75 and designating the observing apparatus to be connected to the connector 70J, a character signal discriminating means 75 connected to the above mentioned frame memory 72 at the G signal output end, discriminating the character/device of the video signal by the G signal and outputting a release signal and character code to the still image filing apparatus 24 by the signal line 23, a reproducing controller 77 connected at the input end to the above mentioned still image filing apparatus at the SYNC (synchronizing signal) line end and at the output end to a later described D/A converter 78 at the control end and to the above mentioned connector 76 at the SYNC (synchronizing signal) line end, a D/A converter 78 connected at the input end to the above mentioned still image filing apparatus 24 at the R, G and B signal output ends and at the output end to the above mentioned connector 76J at the R, G and B video signal lines, a cable 23 connected on one hand to the above mentioned frame memory 72 at the R, G and B signal output ends, the above mentioned character signal discrilminating circuit 75 at the character code output end and release signal output end, the above mentioned connector 70J at the SYNC end and the above mentioned D/A converter 78 and reproducing controller 77 at the SYNC end and on the other hand to the above mentioned still image filing apparatus 24 and a still image filing apparatus 24 recording the input character code and R, G and B image signals in such large capacity recording medium as a photodisc or photomagnetic disc.

The operation of the thus formed endoscope system shall be explained.

When the patient ID is input from the keyboard 17, as explained in the first embodiment, the patient ID will be superimposed on the part of the reference numeral 95 shown in FIG. 18(A) in the pictures of the monitors 15 and 25. Further, the endoscope system operator inputs into the still image filing apparatus a character, for example, of "SEARCH" for searching whether there are patient data relating to the above mentioned patient ID in the recording medium. This character of "SEARCH" is superimposed on the part of the reference numeral 96 in FIG. 18(A) the same as the patient ID.

Thereby, the image file controller 22" will reproduce the picture shown in FIG. 18(B) and relating to the above mentioned patient ID from the still image filing apparatus 24, will display it in the monitor 25 and will return it to the image input apparatus 16 through the cable 76. The video signal of this returned picture will be input into the character signal discriminating circuit 100 and will be output and displayed in the monitor 15'.

The above mentioned character signal discriminating circuit 100 will extract such information as the patient name shown by the reference numeral 98 relating to the patient ID from the image signal of the picture shown in FIG. 18(B) and will output it as a character code to the character signal generating circuit 46.

Thereby, the character signal generating circuit 46 will input such information as the patient name by the character code from the character signal discriminating circuit 100 instead of inputting it from the keyboard.

Therefore, as shown by the reference numeral 98 in FIG. 18(C), a picture in which the patient name and others recorded in the still image filing apparatus are superimposed on the picture imaged by the endoscope 13 will be displayed in the above mentioned image input apparatus 16'.

The other operations are the same as in the first embodiment and shall not be explained here.

By the way, in the endoscope apparatus, an IC card reading apparatus may be used instead of the keyboard 17.

That is to say, in this embodiment, there is an effect that such existing data as the name and others relating to the patient need not be input.

The other effects are the same as in the first and second embodiments.

In FIGS. 19 to 22 is shown the fourth embodiment of the present invention. By the way, the same components as in the above described embodiments shall bear the same reference numerals and shall not be explained here. Also, the formation of the system including the medical instrument interfacing apparatus is the same as in the first embodiment.

Figure 19:
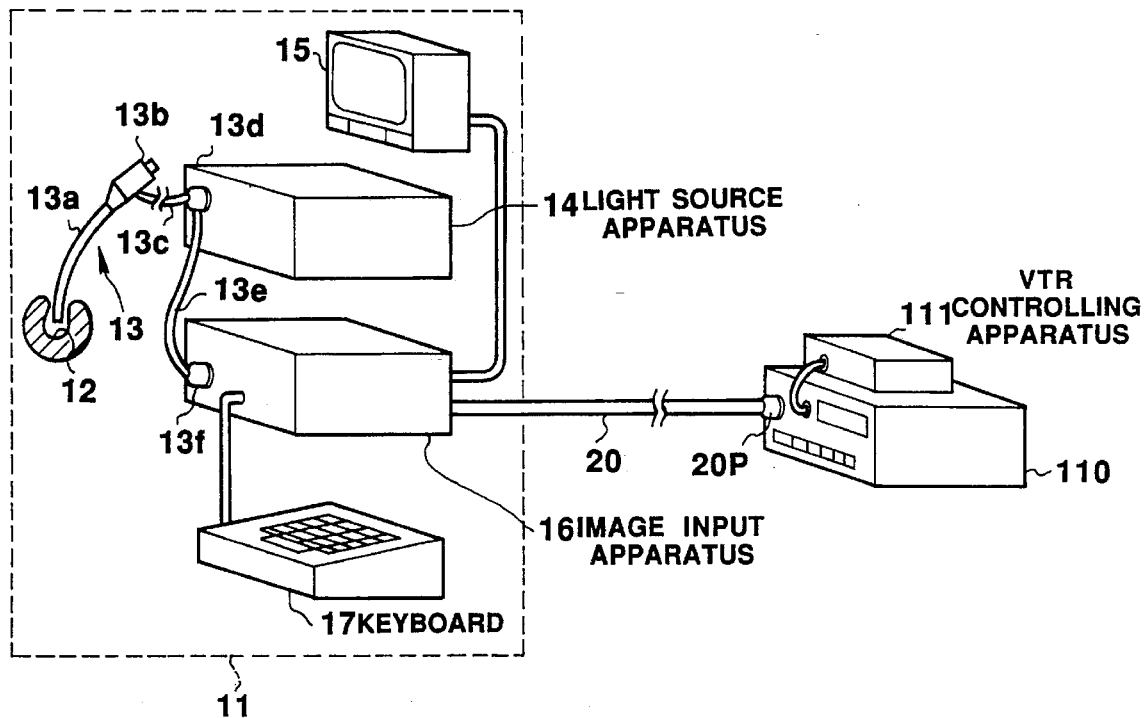
FIGS. 19 to 22 relate to the fourth embodiment of the present invention.

As shown in FIG. 19, the endoscope system comprises an endoscope apparatus 11, a VTR 110 and a VTR controlling apparatus 111. The above mentioned endoscope apparatus 11 and VTR 110 are connected with each other through a cable 20. The above mentioned VTR 110 and VTR controlling apparatus 111 are connected with each other through a signal line.

Figure 20:
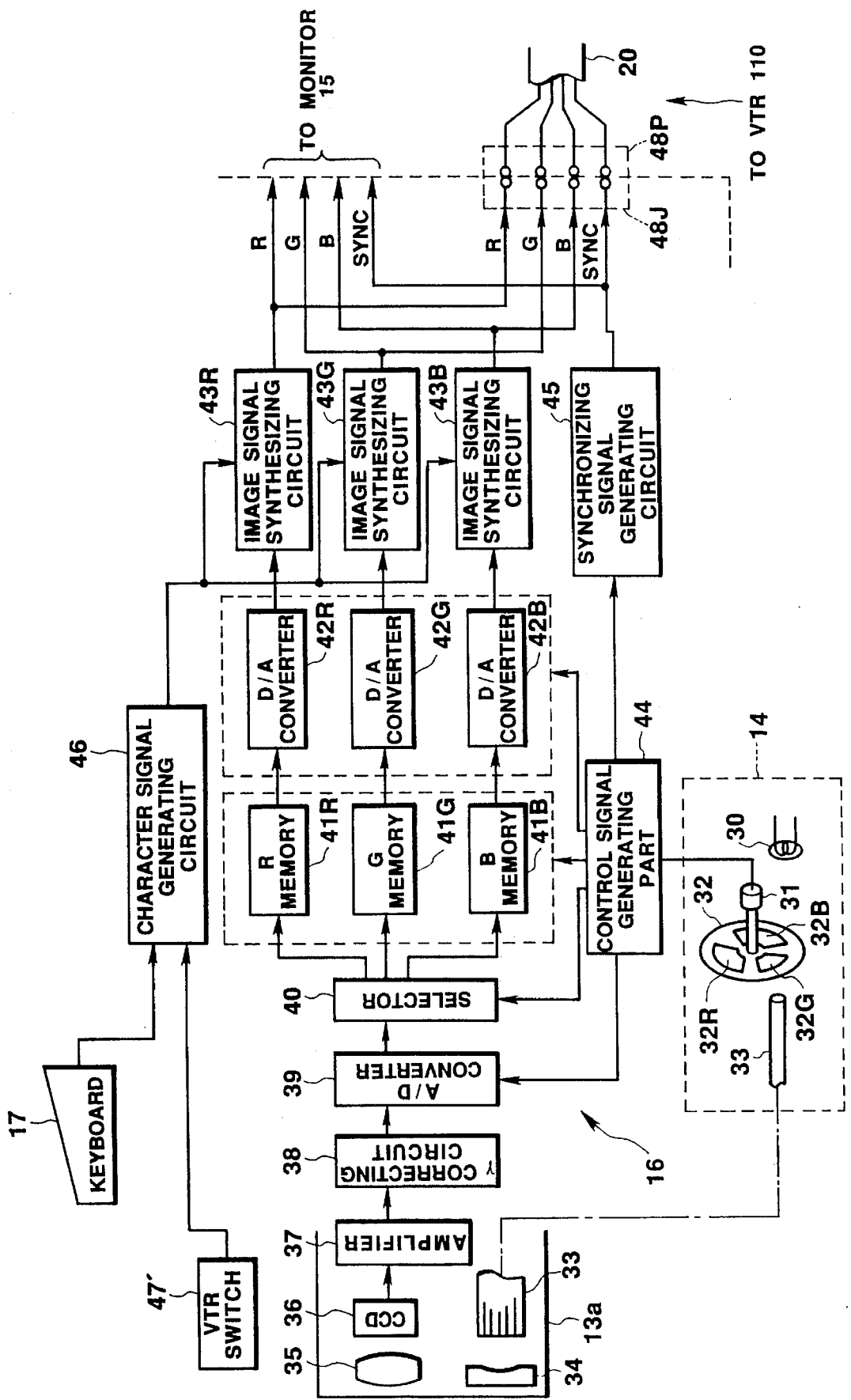

As shown in FIG. 20, an image input apparatus 16 of the above mentioned endoscope apparatus 11 is provided with a VTR switch 47 instead of the release switch 47 explained in the first embodiment. The other formations are the same as in the first embodiment and shall not be explained here.

Figure 21:
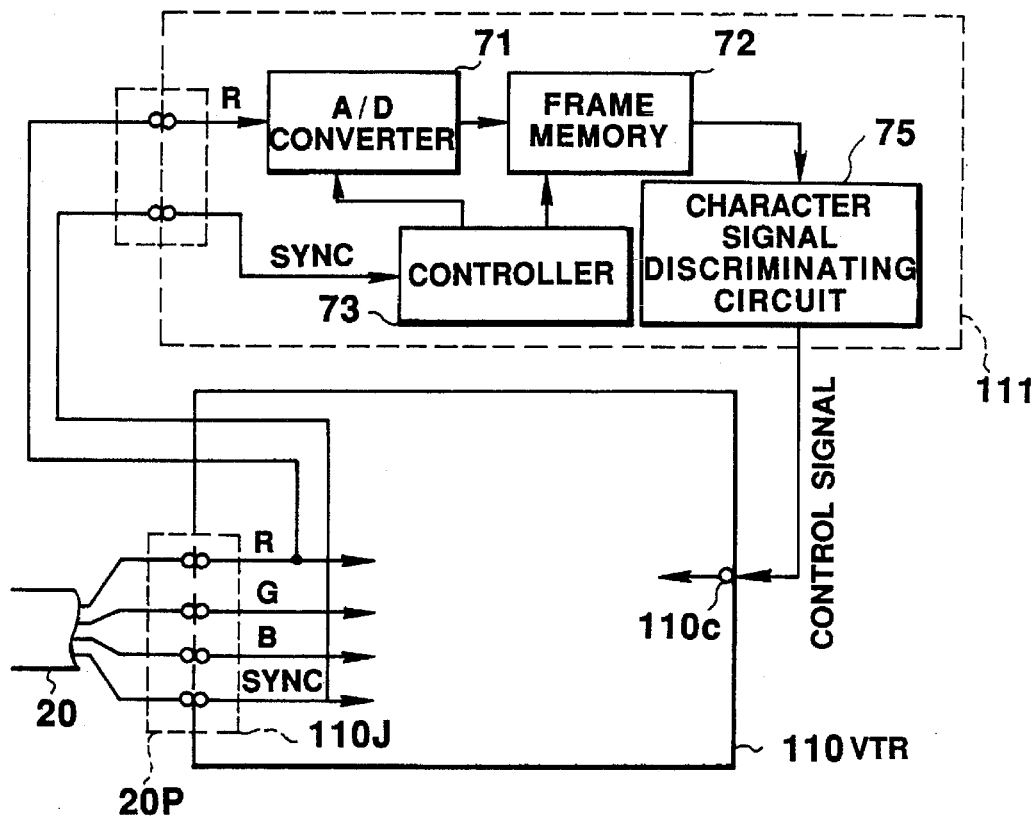

As shown in FIG. 21, the above mentioned VTR controlling apparatus 111 comprises an A/D converter 71, frame memory 72, controller 3 and teletext signal discriminating circuit 75. The above mentioned VTR 110 is provided with a connector 110J to which a connector 20P provided at the end of the above mentioned cable 20 is removably connected and a terminal 110 to which a control signal line controlling the start/end of the above mentioned VTR 110 is connected. The R, G and B video signal lines and SYNC (synchronizing signal) line of the above mentioned image input apparatus 16 are connected to the above mentioned connector 110J through the connector 20P of the above mentioned cable 20. The R video signal line and SYNC (synchronizing signal) line are branched within the VTR 110 and are connected respectively to an A/D converter 71 and controller 73 of the above mentioned VTR controlling apparatus 111. A control signal line from the character signal discriminating circuit 75 of the above mentioned VTR controlling apparatus 111 is connected to the above mentioned terminal 110c.

The operation of the thus formed endoscope system shall be explained.

Figure 22:
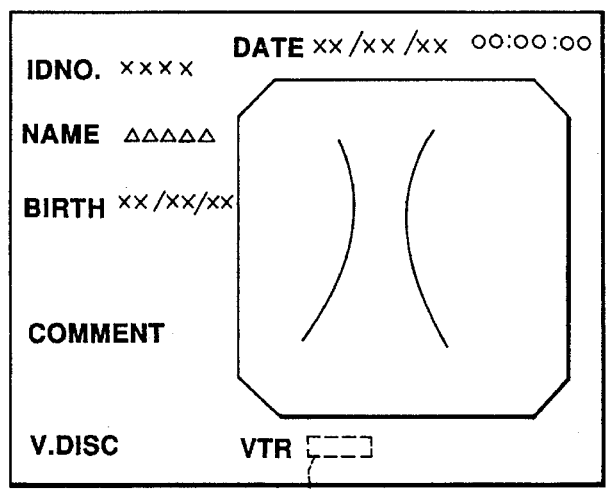

When the VTR switch 47' provided, for example, in the operating part 13b of the above mentioned endoscope 13 is switched on, that is, the VTR 110 starts recording, for example, "ON" will be displayed in a red character in the part shown by the reference numeral 112 in FIG. 22.

As explained in the first embodiment, this character is discriminated by the character signal discriminating circuit 75 of the VTR controlling apparatus 111 and thereby the character signal discriminating circuit 75 outputs a control signal so that the above mentioned VTR 110 may start recording.

Thereby, the VTR 110 records the observed image by the endoscope 13.

When the VTR switch 47' provided, for example, in the operating part 13b of the above mentioned endoscope 13, that is, the VTR 110 stops recording, the character of "ON" in the part shown by the reference numeral 112 in FIG. 22 will be eliminated and thereby the VTR 110 will stop recording by the reaction of the above described "ON".

By the way, instead of taking the R, G, B and SYNC signals out of the VTR 110, an intermediate connector may be provided between the connector 20P and connector 110J to pull out the signal lines.

That is to say, there is an effect that, as the VTR controlling apparatus 111 is provided, the VTR can be controlled.

Figure 24:
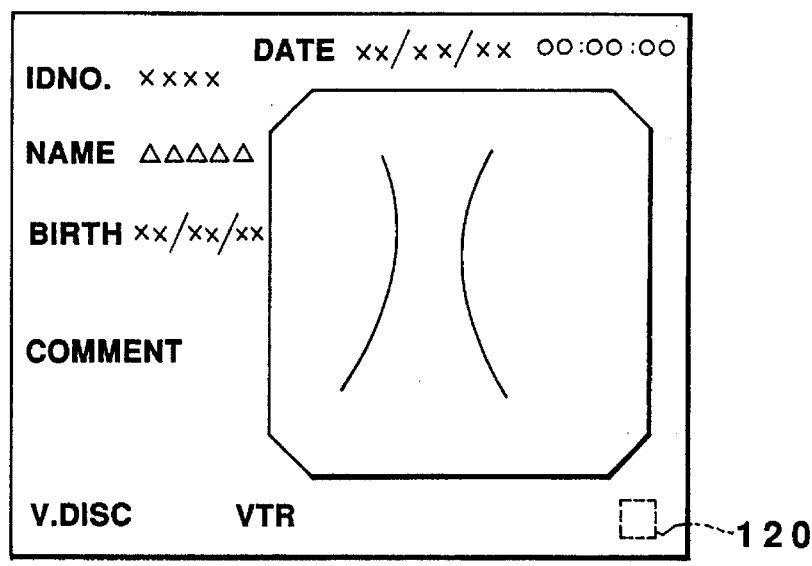
FIGS. 23 and 24 relate to the fifth embodiment of the present invention.
Figure 23:
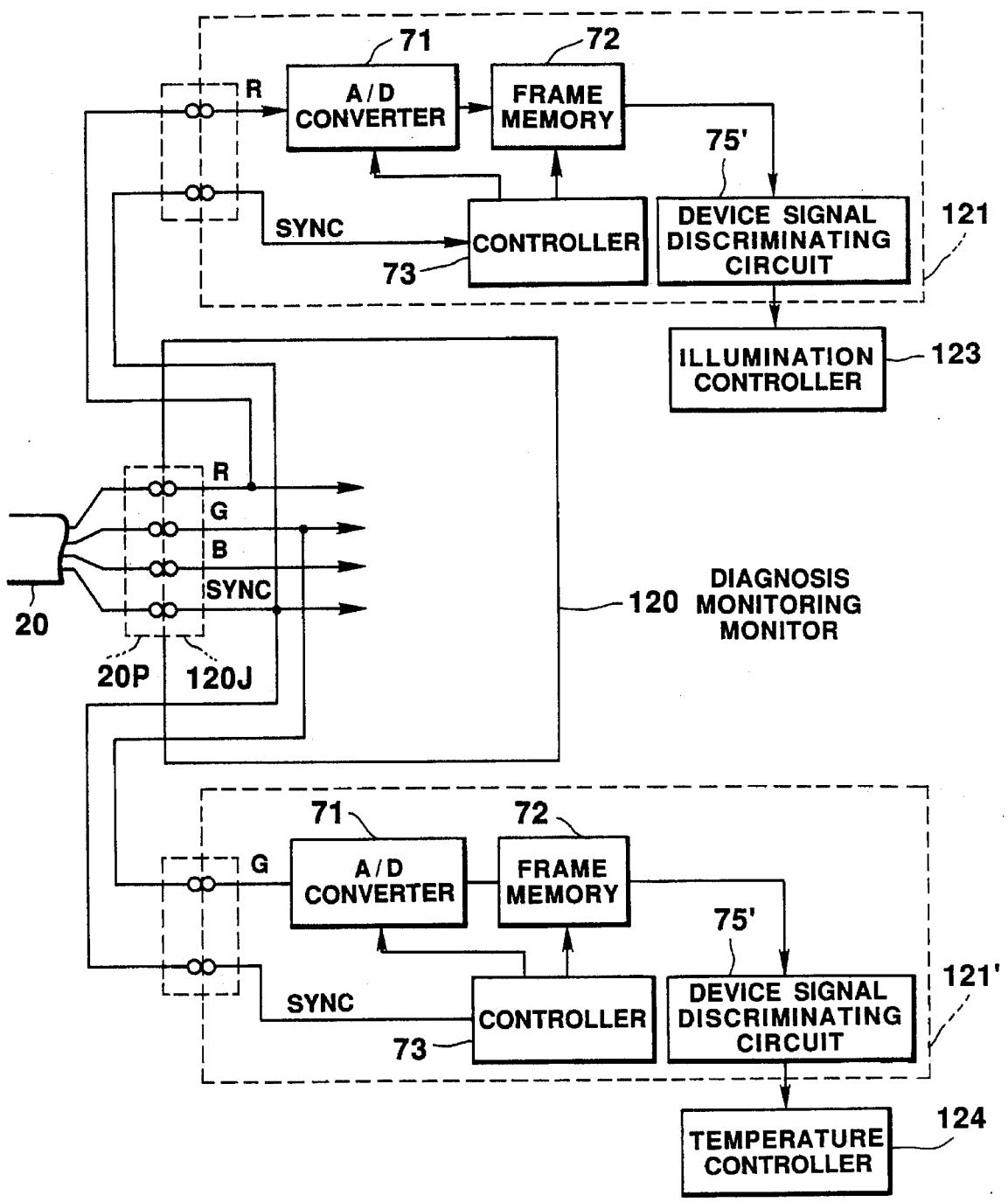

In FIGS. 23 and 24 is shown the fifth embodiment of the present invention. By the way, the same components as in the above described embodiments shall bear the same reference numerals and shall not be explained here. The formation of the system including the medical instrument interfacing apparatus is the same as in the first embodiment.

The endoscope apparatus of this embodiment is the endoscope apparatus explained in the first embodiment and others. A video image on which a control device is superimposed can be output to a later described diagnosis monitoring monitor 120 by the cable 20.

The above mentioned diagnosis monitoring monitor 120 is provided, for example, in a central control room for controlling the endoscope inspection state. This central control room is used to monitor with the above mentioned diagnosis monitoring monitor 120 the video image of the inspection or the like by the above described endoscope and also for the educational explanation.

In the above described central control room, the illumination and temperature of a chamber in which the endoscope inspection is made are controlled in some case.

In this embodiment, controlling apparatus 121 and 121' are connected to this diagnosis monitoring monitor 120.

The above mentioned diagnosis monitoring monitor 120 is provided with a connector 120J to which is removably connected a connector 20P provided at the end of a cable 20 through which a video signal from an endoscope apparatus not illustrated is transmitted. The R video signal line and SYNC (synchronizing signal) line of the connector 120J are connected to the above mentioned controlling apparatus 121. The G video signal line and SYNC (synchronizing signal) line of the above mentioned connector 120J are connected to the above mentioned controlling apparatus 121'.

Each of the above mentioned controlling apparatus 121 and 121' is of the same formation as of the VTR controlling apparatus 111 explained in the fourth embodiment and is provided with a device signal discriminating circuit 75' instead of the character signal discriminating circuit 75. This device signal discriminating circuit 75' operates the same as the character signal discriminating circuit 75 except discriminating the device.

The device signal discriminating circuit 75' of the above mentioned controlling apparatus 121 is connected at the control signal output end to an illumination controller 123 controlling the illumination of an endoscope inspection chamber. The device signal discriminating circuit 75' of the above mentioned controlling apparatus 121' is connected at the control signal output end to a temperature controller 124 controlling the temperature of the endoscope inspection chamber.

The operation of the thus formed endoscope system shall be explained.

In the case of increasing the illuminating light amount of the endoscope inspection chamber, when the switch, for example, of "L. UP" of a keyboard not illustrated is pushed down, red (R) "▲" will be displayed in the part shown by the reference numeral 120 in FIG. 24 in the observed image of the endoscope. In the case of decreasing the illuminating light amount, when the switch, for example, of "L. DOWN" of the keyboard not illustrated is pushed down, red (R) "▼" will be displayed in the part shown by the reference numeral 120 in FIG. 24 in the observed image of the endoscope.

The above mentioned controlling circuit 121 will discriminate the above described "▲" and "▼" by the device signal discriminating circuit 75' and will output a control signal to increase or decrease the illuminating light amount to the illumination controller 123 from the above mentioned device signal discriminating circuit 75'.

In the case of elevating the temperature of the endoscope inspection chamber, when the switch, for example, of "T. UP" of the keyboard not illustrated is pushed down, green (G) "▲" will be displayed in the part shown by the reference numeral 120 in FIG. 24 in the observed image of the endoscope. In the case of lowering the temperature, when the switch, for example, of "T. DOWN" of the keyboard not illustrated is pushed down, green (G) "▼" will be displayed in the part shown by the reference numeral 120 in FIG. 24 in the observed image of the endoscope.

The above mentioned controlling circuit 121' will discriminate the above described "▲" and "▼" by the device signal discriminating circuit 75' and will output a control signal to elevate or lower the temperature to the temperature controller 124 from the above mentioned device signal discriminating circuit 75'.

By the way, the recognizing devices are not limited to "▲" and "▼" but may be any other devices.

That is to say, there is an effect that a plurality of instruments can be controlled by one video signal cable.

The other effects are the same as in the above described embodiments.

In FIGS. 25 to 34 is shown a first modification of the third embodiment of the present invention.

Figure 26:
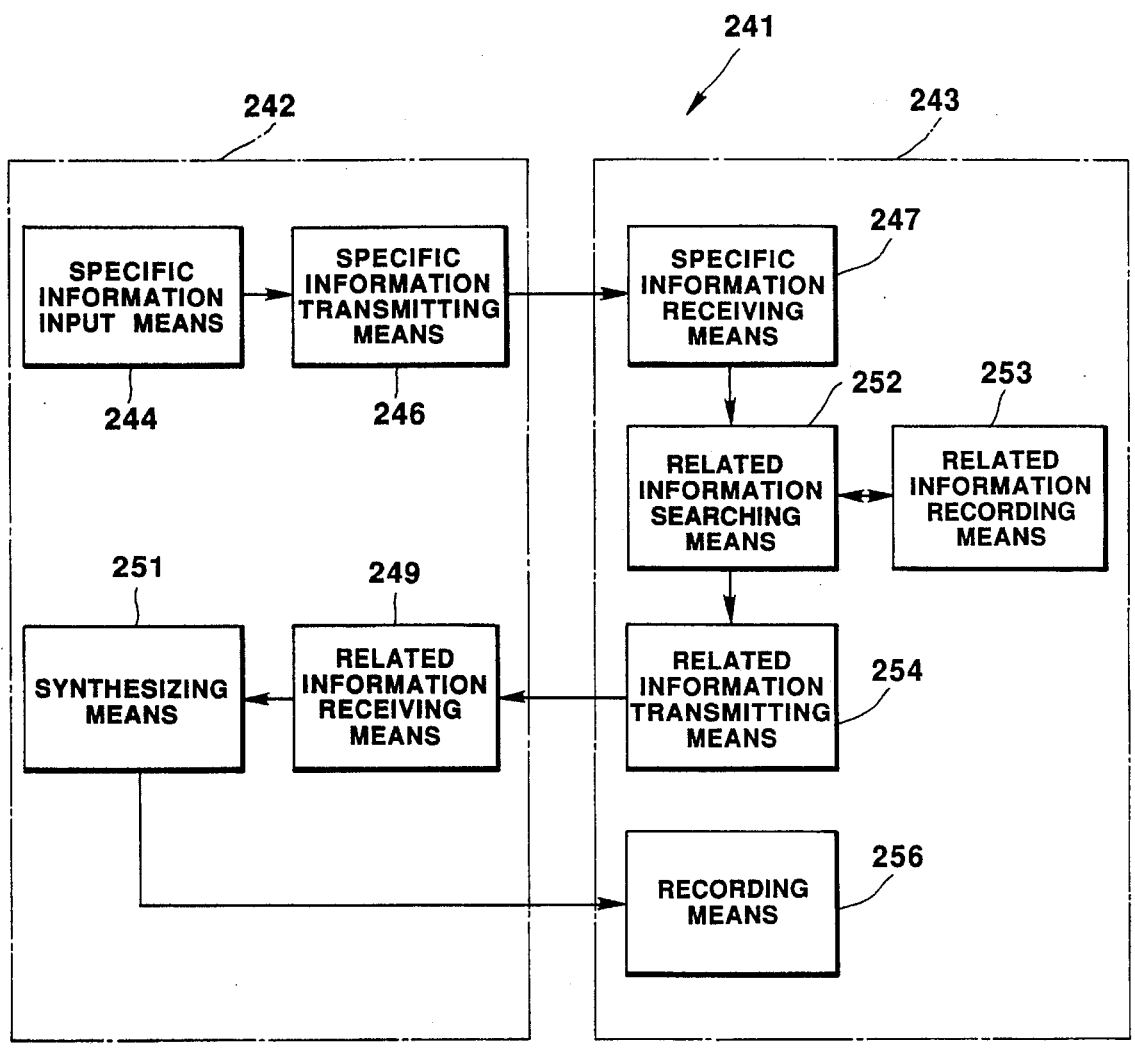

In FIG. 26, a schematic explanation of this modification shall be made.

The image filing system 241 of this modification comprises an image output apparatus 242 and an image reproducing apparatus 243. The image output apparatus 242 is provided with a specific information input means 244 inputting the information specifying the object of the image to be imaged and outputting the input specific information to a specific information transmitting means 246 outputting the input specific information to a specific information receiving means 247 provided in the image reproducing apparatus 243.

Further, the image output apparatus 242 is provided with a related information receiving means 249 receiving the related information output from the image reproducing apparatus 243 and outputting the related information to a synthesizing means 251 synthesizing the related information with the imaged image and outputting the image to the image reproducing apparatus 233.

On the other hand, the image reproducing apparatus 243 is provided with a related information searching means 252 to which the specific information is input from the above mentioned specific information receiving means 247 and to which is connected a related information recording means 253 recording the information related to the object of the image and which searches the related information recorded in the related information recording means 253 and outputs the related information to a related information transmitting means 254 outputting the related information to a related information receiving means 249 provided in the above mentioned image output apparatus 242.

The image reproducing apparatus 243 is provided with a recording means 256 receiving the output of the above mentioned synthesizing means 251 and recording the image synthesized with this related information.

Figure 25:
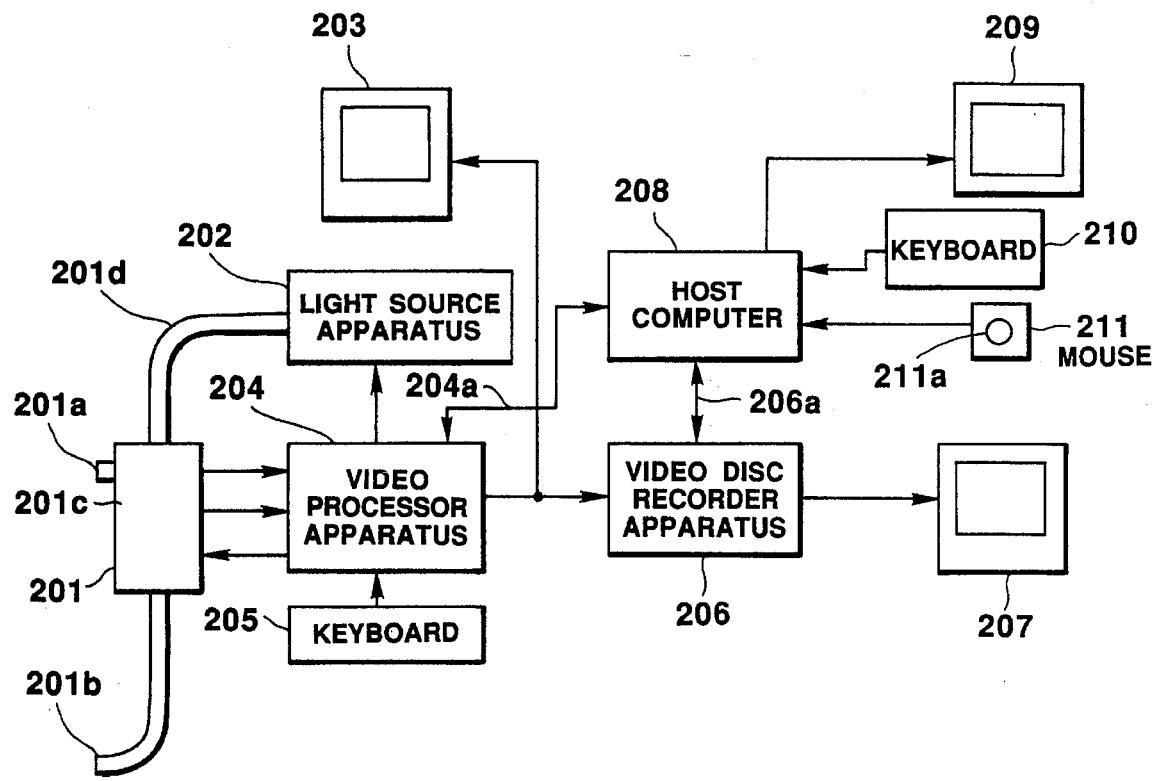

Now, in FIG. 25, the concrete formation of the image filing system 241 shall be explained.

By the way, in this modification, the above mentioned image output apparatus 242 comprises an electronic scope apparatus 201, a light source apparatus 202, a first TV monitor 203, a video processor apparatus 204 and a first keyboard 205. The image reproducing apparatus 243 comprises a video disc recorder apparatus 206, a second TV monitor 207, a host computer 208, a computer display 209, a second keyboard 210 and a mouse 211.

Figure 27:
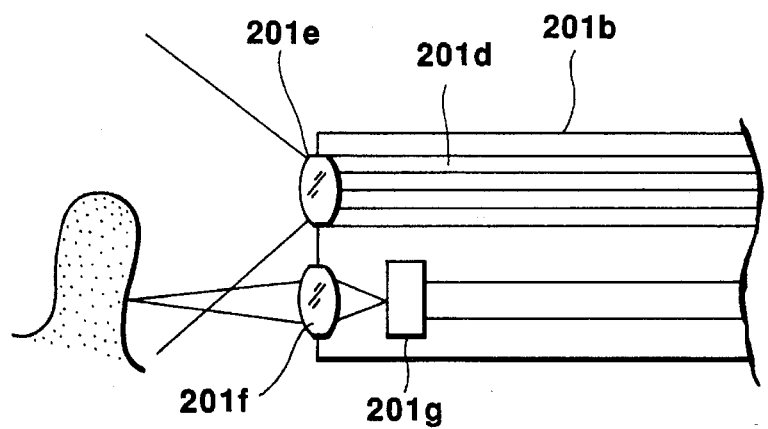

In FIG. 25, an illuminating light is led into the electronic scope apparatus 201 through a light guide 201d from the light source apparatus 202 and is radiated from its tip part 201b. That is to say, as shown in FIG. 27, in the tip part 201b are arranged an illuminating lens 201e radiating the illuminating light from the light guide 201d, an objective lens 201f forming the image of an observed part illuminated by the illuminating light and a solid state imaging device 201g set in the position in which the image of the observed part is formed, operated by a driving signal from the video processor apparatus 204, converting the formed image to an electric signal and connected to output the image signal to the video processor apparatus 204. Returning to FIG. 25, further, in the electronic scope apparatus 201, a release switch 201a is arranged in the operating part 201c and is connected so that the operating signal of the release switch 201a may be output to the video processor apparatus 204.

Figure 28:
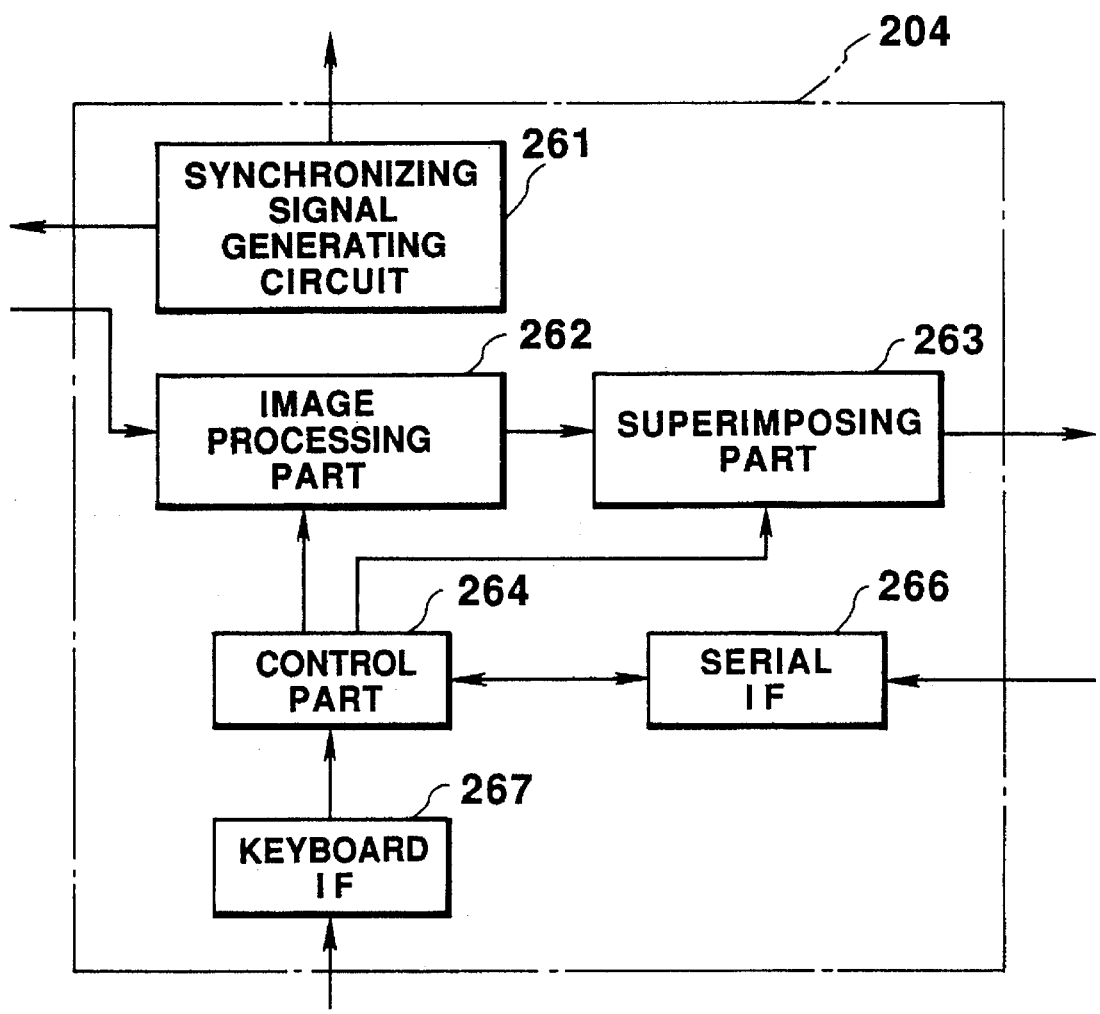

As shown in FIG. 28, the video processor apparatus 204 has a synchronizing signal generating circuit 261 feeding a synchronized timing signal and driving signal respectively to the light source apparatus 202 and electronic scope apparatus 201 so that the above mentioned image signal may be read out of the solid state imaging device 201 by the driving signal applied from this synchronizing signal generating circuit 261. The image signal is input into an image processing part 262 which processes the image signal and outputs it as a so-called video signal. The video signal is output to the first TV monitor 203 and video disc recorder apparatus 206 through a superimposing part 263.

A control signal is input from a controlling part 264 to the above mentioned processing part 262 and superimposing part 263 as a synthesizing means 251. Further, the controlling part 264 is so connected that a serial interface 266 as the specific information transmitting means 246 and related information receiving means 249 may input and output a control signal with the host computer 208.

Also, the first keyboard 205 as the specific information input means 244 is connected to the controlling part 264 through a keyboard interface 267 so that such data as a patient ID, name and date of birth may be input.

Figures 32, 33:
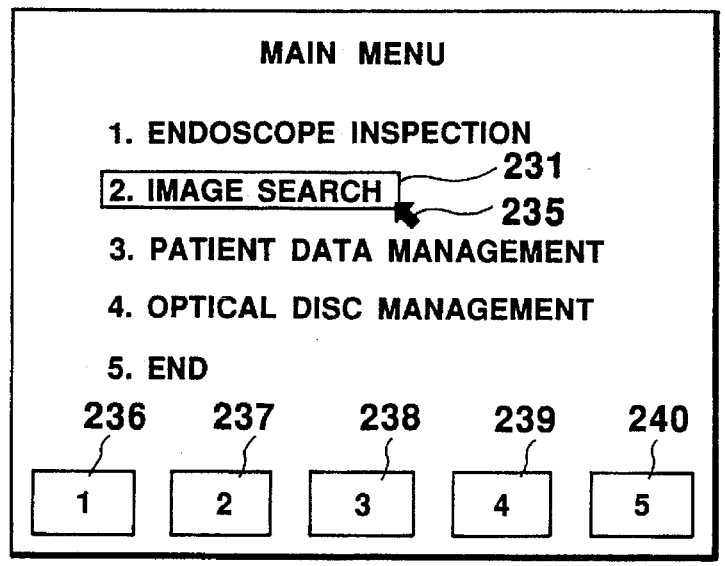

Returning to FIG. 25, a first serial transmitting path 204a is connected between the above mentioned serial interface 266 and host computer 208 so that a command and data may be transmitted and received. When the respective data in the picture shown in FIG. 33 are input, the contents will be automatically transmitted and the "RELEASE" by the operation of the release switch 201a and the "INSPECTION END" input from the first keyboard 205 will be respectively transmitted. The data transmitted from the host computer 208 will be displayed in the predetermined positions in the picture shown in FIG. 33.

The video disc recorder apparatus 206 as the above mentioned recording means 256 will record and reproduce the input video signal and its operation will be controlled by the command transmitted through a second serial transmitting path 206a connected with the host computer 208. A list of commands of the video disc recorder apparatus 206 is shown in Table 1. By the way, the photodisc will be loaded automatically after the photodisc is inserted manually into an inserting port not illustrated of the video disc recorder apparatus 206. The output of the video disc recorder apparatus 206 is connected to the second TV monitor 207 displaying the image.

TABLE 1

| Command Set of Video Disc Recorder Apparatus | | |
| --- | --- | --- |
| Command | Parameter | Operation |
| Recording mode set. | — | Reproduction of image is stopped and top track head of vacant region of disc is moved to make recordable state. |
| Still picture recording | — | Image of 1 frame is recorded and head is moved to next track. |
| Recording mode releasing. | — | Recording mode ends, reproducing mode is made and image of track then is reproduced. |
| Track searching. | Track No. | Designated track head is moved and recorded image is reproduced to still picture. If in recording mode, nothing will be done. |
| State checking. | — | Which of (1) Recording mode or (2) Reproducing mode is checked and returned. |

TABLE 1-continued

| Command Set of Video Disc Recorder Apparatus | | |
| --- | --- | --- |
| Command | Parameter | Operation |
| Track No. checking. | — | Track position of present head is returned. |
| Photo disc ejecting. | — | Loaded photodisc is ejected. If photodisc is not loaded, nothing will be done. |
| Photo disc apparatus. | Disc No. | Disc No. is registered in photodisc. |
| Photodisc checking. | — | Photodisc No. of loaded photodisc is returned. If photodisc is not loaded, "−1" will be returned. If disc No. is not registered in photodisc, "0" will be returned. |

A computer display 209 displaying the output information, a second keyboard 210 inputting the data and others and a mouse 211 inputting the position coordinates on the computer display 209 are connected to the host computer 208. Here, a mouse switch 211a to be used to designate the position or the like is attached to the mouse 211.

Figure 29:
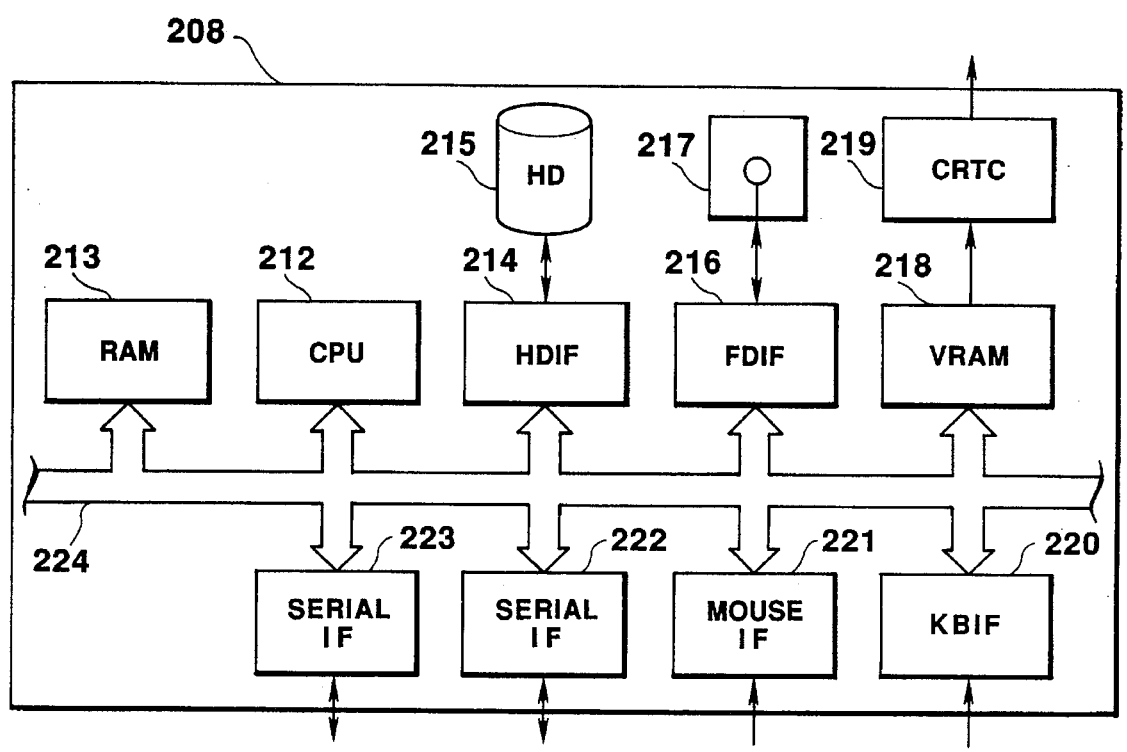

In FIG. 29 is shown the host computer 208 in detail.

In FIG. 29, a CPU 212, a RAM 213, a hard disc interface 214, a hard disc apparatus 215 as a related information recording means 253, a floppy disc interface 216, a driving apparatus a video RAM 218, a CRT controller 219, a keyboard interface 220, a mouse interface 221, a first serial interface 222 and a second serial interface 223 as a specific information receiving means 247 and a related information transmitting means 254 are respectively connected to a computer bus 224, a computer display 209 is connected to the CRT controller 219 and a second keyboard 210 is connected to the keyboard interface 220 so as to function as an independent so-called personal computer.

The mouse interface 221 is connected with the mouse 211 to receive the position information from the mouse 211 and the operation information of the mouse switch 211a and to transmit them to the CPU 212 through the computer bus 224.

The first and second serial interfaces 222 and 223 make serial communications with outside instruments on the basis, for example, of the RS-232C standard. Here, in the first serial interface 222, a communication is made with the video disc recorder apparatus 206 and, in the second serial interface 223, a communication is made with the video processor apparatus 204.

Data base files as the related information are recorded in the hard disc apparatus 215. The contents of the recorded data base files are shown in FIG. 30.

In FIG. 30, FIG. 30(a) is of a patient data file in which the data of respective inspected patients are recorded. That is to say, the "Patient ID" is a number separately attached to each patient so that one patient may be specified by specifying this number. The "Name" represents the name of the patient. In the "Sex", the "M" represents a male and the "F" represents a female. The "Date of Birth" is represented as a number of eight digits in the Christian calender, the upper four digits represent the year, the next two digits represent the month and the last two digits represent the day.

Next, FIG. 30(b) shows an inspection data file in which one inspection made on one patient is recorded as a unit. The "Inspection ID" represents a number attached to the inspection in the order of the inspection so that one inspection may be specified by specifying this number. The "Inspection date" represents the day on which the inspection was made and is represented by the same method as of the date of birth in the patient data. The "Patient ID" represents the patient ID of the patient on whom the inspection was made. The "Disc No." represents the number of the photodisc in which the image of the inspection is recorded so that one photodisc may be specified by specifying this number. The "Record start position No." represents a track No. of the image recorded first in the inspection. The "Record end position No." represents a track No. of the finally recorded image. The respective images recorded between them are recorded in the time order between these two track Nos.

Last, FIG. 30(c) shows a disc data file in which the information relating to the respective photodiscs in which the inspection images are recorded is recorded. The "Disc No." represents a number separately attached to each disc. The "Date of registration" represents the day on which the disc No. was registered in the photodisc and is represented by the same method as of the date of birth in the patient data. The "Final recording position No." represents a track No. of the image finally recorded in the disc.

A program controlling the operation of the CPU 212 is also memorized in the hard disc apparatus 215 and is transferred to the RAM 213 through the hard disc interface 214 so as to be sequentially read and carried out by the CPU 212.

Figure 31:
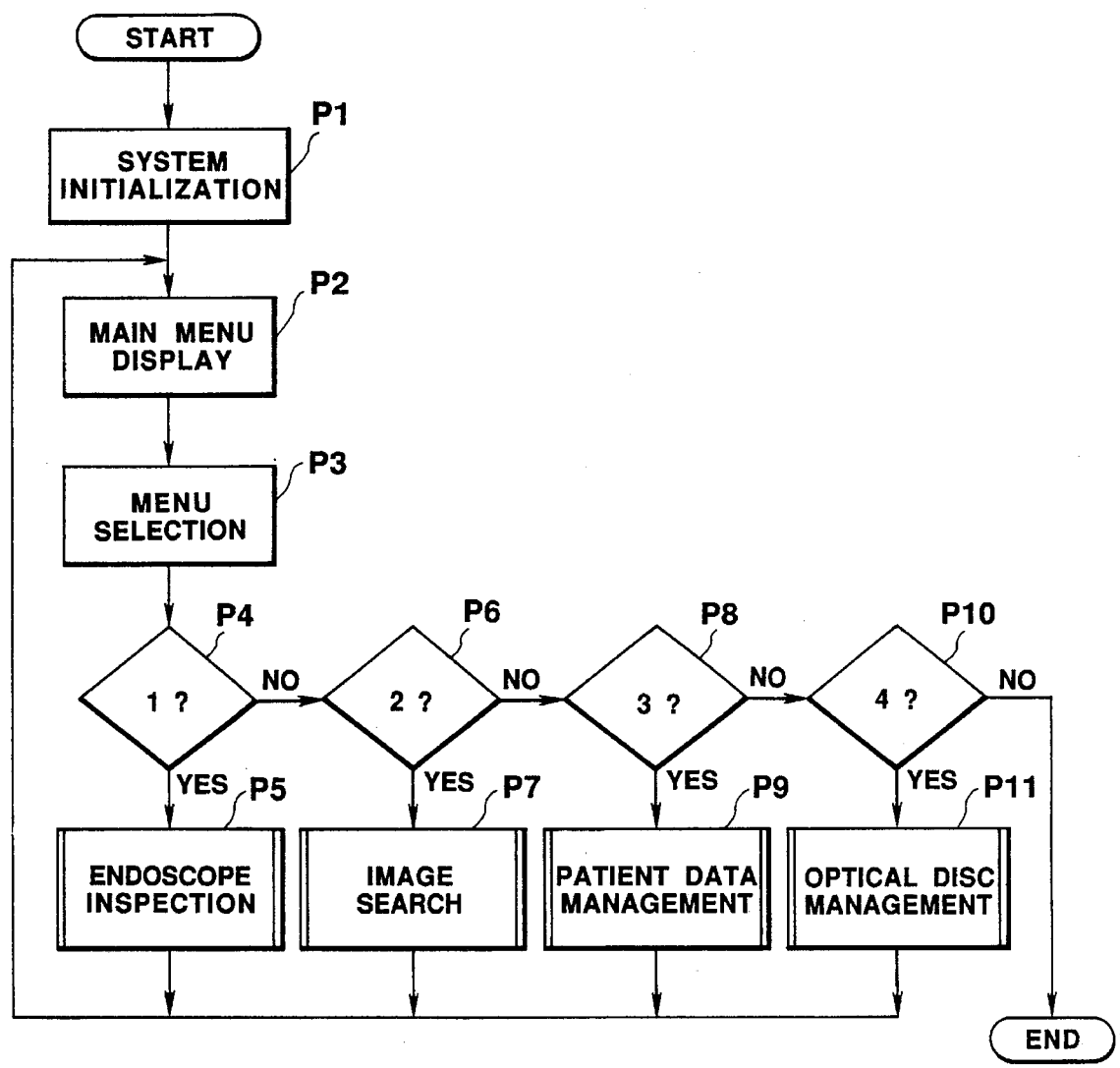

FIG. 31 shows a flow chart representing the entire program.

In FIG. 31, in P1, various initializations are made.

In P2, the main menue shown in FIG. 32 is displayed on the computer display 209. The CPU 212 sequentially reads the picture formats out of the RAM 213 and transferrs them to the VRAM 218 and the CRT controller 219 outputs the data on the VRAM 218 to display the main menu.

In P3, one menu is selected by the operation of the operator out of the main menu displayed in P2.

That is to say, in FIG. 32, menues of Nos. 1 to 5 are displayed and there are first to fifth buttons 236, 237, 238, 239 and 240 corresponding to the respective numbers. A mouse cursor 235 will move on the picture when the mouse 11 is operated and will designate the position on the picture of the mouse cursor 235 when the mouse switch 211a is pushed. That is to say, when the mouse cursor 235 is moved on the first to fifth buttons 236, 237, 238, 239 and 240 and the mouse switch 211a is pushed there, the menu corresponding to the button will be selected.

When the mouse cursor 235 is moved to the displaying positions of the respective menus and the mouse switch 211a is pushed there, a selected marker 231 will be displayed to enclose the menu and, when the mouse switch 211a is pushed again within the selected marker 231, the menu will be able to be also selected.

The selection of the menu or command by using the picture display and mouse 211 is substantially the same also in other pictures and shall be omitted hereinafter.

In FIG. 31, in P4, it is discriminated whether the selected menu is "1" or not. If it is "1", the program will move to P5 but, if not so, the program will move to P6.

In P6, it is discriminated whether the selected menu is "2" or not. If it is "2", the program will move to P7 but, if not so, the program will move to P8.

In P8, it is discriminated whether the selected menu is "3" or not. If it is "3", the program will move to P9 but, if not so, the program will move to P10.

In P10, it is discriminated whether the selected menu is "4" or not. If it is "4", the program will move to P11 but, if not so, the selected menu will be considered to be "5", that is, to end and the program will end.

In P5, the endoscope inspection is processed.

Figure 34:
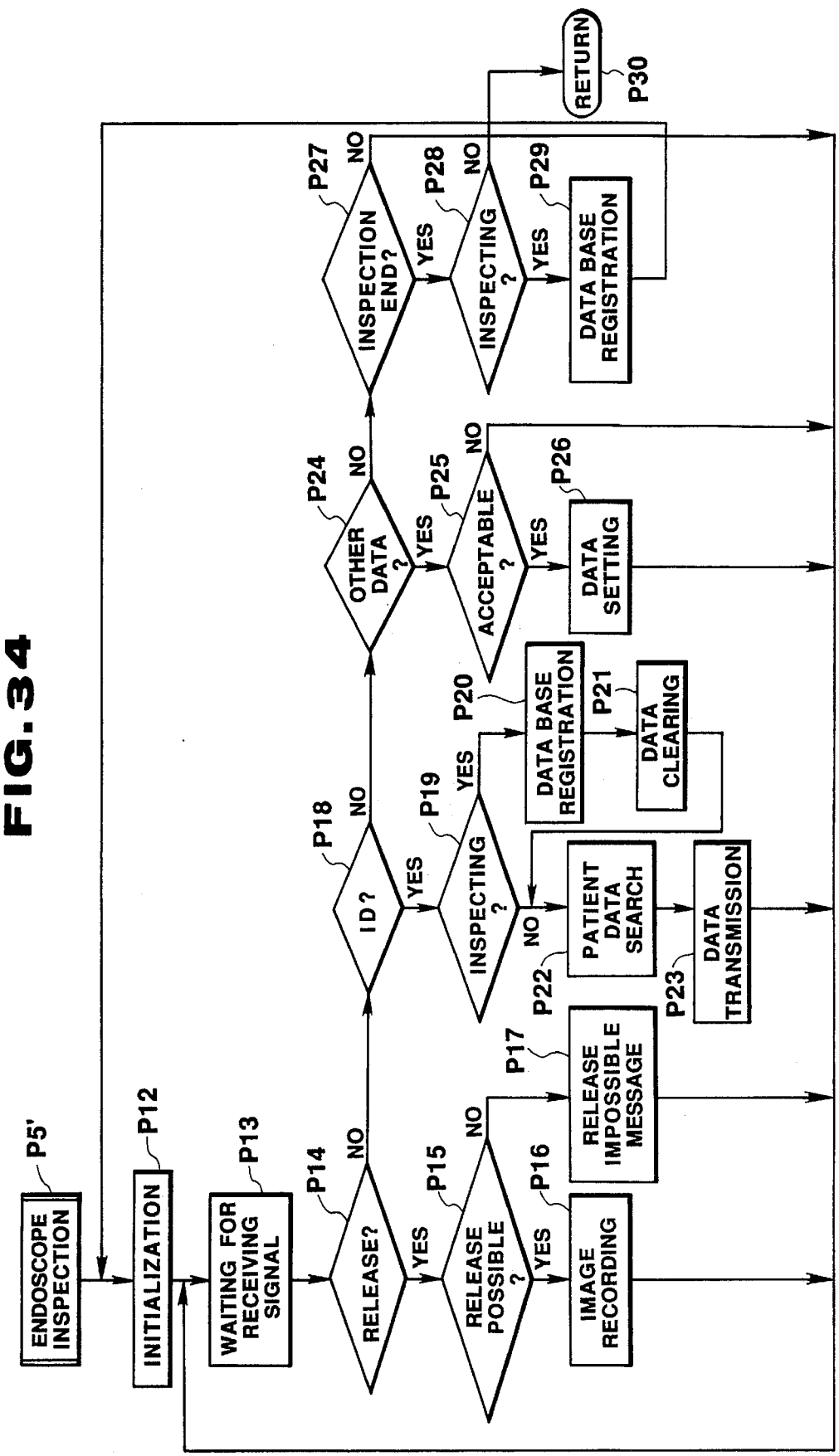

A flow chart of a sub-routine of the endoscope inspection is shown in FIG. 34.

In FIG. 34, in P12, various data are initialized, a command of the "Recording mode set" is transmitted to the video disc recorder apparatus 206 and then a track No. is obtained by a command of the "Track No. checking".

In P13, the data from the video processor apparatus 204 are waited to be received.

In P14, it is judged whether the transmitted data are "Release" or not. If they are "Release", the program will proceed to P 15 but, if not so, the program will proceed to P16.

In P15, it is judged whether the release is possible or not. That is to say, if the patient ID has been already input or if the patient name and date of birth have been both input, the program will proceed to P16 as the release is possible but, in other cases, the program will proceed to P7.

By the way, the patient ID and patient name and date of birth become specific information.

In P16, a command of the "Still picture record" is transmitted to the video disc recorder apparatus 206.

In P17, a message that the release can not be made is output.

In P18, it is judged whether the data received in P13 are the patient ID or not. If they are the patient ID, the program will proceed to P19 but, if not so, the program will proceed to P24.

In P19, it is judged whether the inspection is now being made or not, That is to say, if the image has been already recorded or if the registration in the data base relating to the image has not yet been made, the inspection will be considered to be being made and the program will proceed to P20 but, in other cases, the program will proceed to P22.

In P20, the so far recorded images are newly registered in the data base. That is to say, the command of the "Track No. checking" is transmitted to the video disc recorder apparatus 206 to obtain a track No. The track No. obtained in P12 and made a record start position No. and the track No. obtained here and made a record end position No. are added together with the related data to the end of the inspection data file. The patient who is not yet registered in the patient data file is registered therein. Further, if the patient ID has not been input, the number next the patient ID at the end of the patient data file will be automatically given.

In P21, various other data than the data judged in P18 to be the patient ID are cleared.

In P22, the patient data file is searched on the basis of the patient ID.

In P23, the patient data searched in P22 are transmitted to the video processor apparatus 204.

In P24, it is judged whether the data received in P13 are the "Name", "Date of birth" or "Sex". If they correspond to any of them, the program will proceed to P25 but, in other cases, it will proceed to P27.

In P25, it is judged whether the received data are acceptable or not. That is to say, if the patient ID has not yet been input or even if it has been already input, if it has not yet been registered, it will be made acceptable and the program will proceed to P26 but, in other cases, nothing will be done and the program will return to P13.

In P26, the data are set and held. That is to say, if the data are registered in the data base from this state, the data set here will be recorded.

In P27, it is judged whether the data received in P13 are of the "Inspection end" or not. If they are of the "Inspection end", the program will proceed to P28 but, if not so, it will return to P13.

In P28, it is judged whether the inspection is now being made or not. That is to say, if the image has been already recorded but has not yet been registered in the data base relating to the image, the inspection will be considered to be being made and the program will proceed to P29 but, in other cases, it will proceed to P30.

In P29, the same process as in P20 is made.

In P30, the sub-routine ends and the program returns to the called routine. By the way, the flow from the above mentioned P12 to P30 constitutes the above mentioned related information searching means 252.

Returning to FIG. 31, in P 7, the image is searched. In searching the image, the operator inputs a keyword, the inspection corresponding to the keyword is called out and the image recorded in the inspection is displayed.

In P9, the patient data are managed.

In the patient data management, the contents of the patient data file shown in FIG. 30(a) are edited. That is to say, by the operation of the user, a new patient is registered, that is, the data are added to the patient data file or the existing patient data are corrected.

In P11, the photodisc is managed.

In managing the photodisc, it is confirmed whether the photodisc has been registered or not. In case it has been registered, the disc No. will be confirmed, the already registered disc and the list of the numbers of the image record sheets will be displayed and the new disc will be registered.

The operation of this modification shall be explained in the following.

In FIG. 31, when the program is started, the system will be initialized in P1 and then the main menu in FIG. 32 will be displayed in the computer display 209 in P2.

Here, if "1" is input, the endoscope inspection will be carried out.

At this time, the light source apparatus 202 will emit an illuminating light on the basis of a timing signal from the video processor apparatus 204 and the illuminating light will be radiated toward a part to be observed from the illuminating lens 201 through the light guide 201. The image of the illuminated observed part will be formed on the solid state imaging device 201g by the objective lens 201f and will be converted to an electric signal by the solid state imaging device 201g driven by a driving signal from the sinchronizing signal geneating circuir 261 of the video processor apparatus 204 and this electric signal will be converted to a video signal by the image processing part 262 of the video processor apparatus 204. The converted video sinai will be output to the first TV monitor 203 through the superimposing part 263 and will be displayed in the endoscope displaing part 203a of the monitor image shown in FIG. 33 and will be output also to the video disc recorder apparatus 206.

At this time, the host computer 208 will make an operation based on FIG. 34.

When the operator inputs the patient ID from the keyboard 205, the processes in P18, 19, 22 and 23 will be made and the data relating to the patient will be transmitted to the video processor apparatus 204 and will be displayed in the first TV monitor 203. Then, if the operator operates the release switch 201, the image will be recorded in P14, 15 and 16. If the "Inspection end" is input, in P27, 28 and 29, the registration in the data base will be made and the inspection will end.

If the patient ID is not yet registered, in P23, nothing will be transmitted but, instead, if the operator inputs any other data, the processes in P24, 25 and 26 will be made and, when the inspection ends, those data will be registered in the patient data file and inspection data file.

Even if the patient ID is not input, if the patient name and date of birth are input, the inspection will be made and, when the inspection ends, those data will be registered in the patient data file and inspection data file together with the automatically generated patient ID.

If the patient ID is once input and is already registered in the patient data file, even if thereafter the operator inputs any other related data, they will be ignored in the processes in P24 and 25 and the registered data will be finally recorded in the data base.

When the inspection ends, in case the operator does not input the "Inspection end" but re-writes the patient ID, the inspection will be considered to have automatically ended and the contents up to then will be registered in the data base by the processes in P18, 19, 20 and 21. Thereafter, the program will enter the processes in P22 and 23 for any other new inspection.

After the inspection once ends, if the "Inspection end" is input again, the process of the "Endoscope inspection" will end in P27, 28 and 30 and the program will return to P2 in FIG. 31.

Returning to FIG. 31, if the command of the "Patient data management" is selected in P3, the patient data will be managed in P9. Here, new patient data prior to the inspection are input and, in case already input data are wrong, the data will be corrected.

If the command of the "Photodisc management" is selected, the photodisc management in P11 will be made and a new disc will be registered.

In this modification, when the endoscope inspection is started, the operator will only input the patient ID but the other data will be automatically set. Therefore, it is very convenient and the possibility of wrong data being input is low. Even a new patient whose patient ID is not yet registered will be inspected if the patient name and date of birth are input. Further, when the inspection ends, the patient ID will be automatically given. Therefore, it is convenient and a quick inspection can be made.

By the way, in the process shown in FIG. 34, when the inspection ends, the registration in the data base will be made but, at every release, the registration may be made. In such case, even if the electricity suspends during the inspection, the data will be recorded in the photodisc but will not be registered in the data base.

The contents as of the inspection data file, patient data file and disc data file are shown in FIG. 30 and are utilized in the respective displayed pictures but are not limited to those shown here. Such patient data as, for example, the patient disease name, whether there is a previous disease or allergy, the data of the patient family and such body data as the body height and weight and such inspection data as the inspecting doctor, inspection starting time, required inspection time, whether there has been a living body inspection and the result of the inspection may be related to be a data base, may be input and edited and may be related into a proper picture to be displayed and referred to.

Also, the patient age at the time when the inspection is made may be entered in the inspection data file. The patient age can be calculated from the date of birth and the inspection day and can be automatically calculated and registered at the time of registering the date of birth or at the time of the inspection after the registration.

P19 and 28 in FIG. 34 may be changed and, even if there is no recorded image, the registration may be made as inspection data. In this case, for example, in case such system is newly introduced, by registering the inspection before the introduction without the image, the data relating to the patient diagnosed continuously can be managed en bloc.

Figure 35:
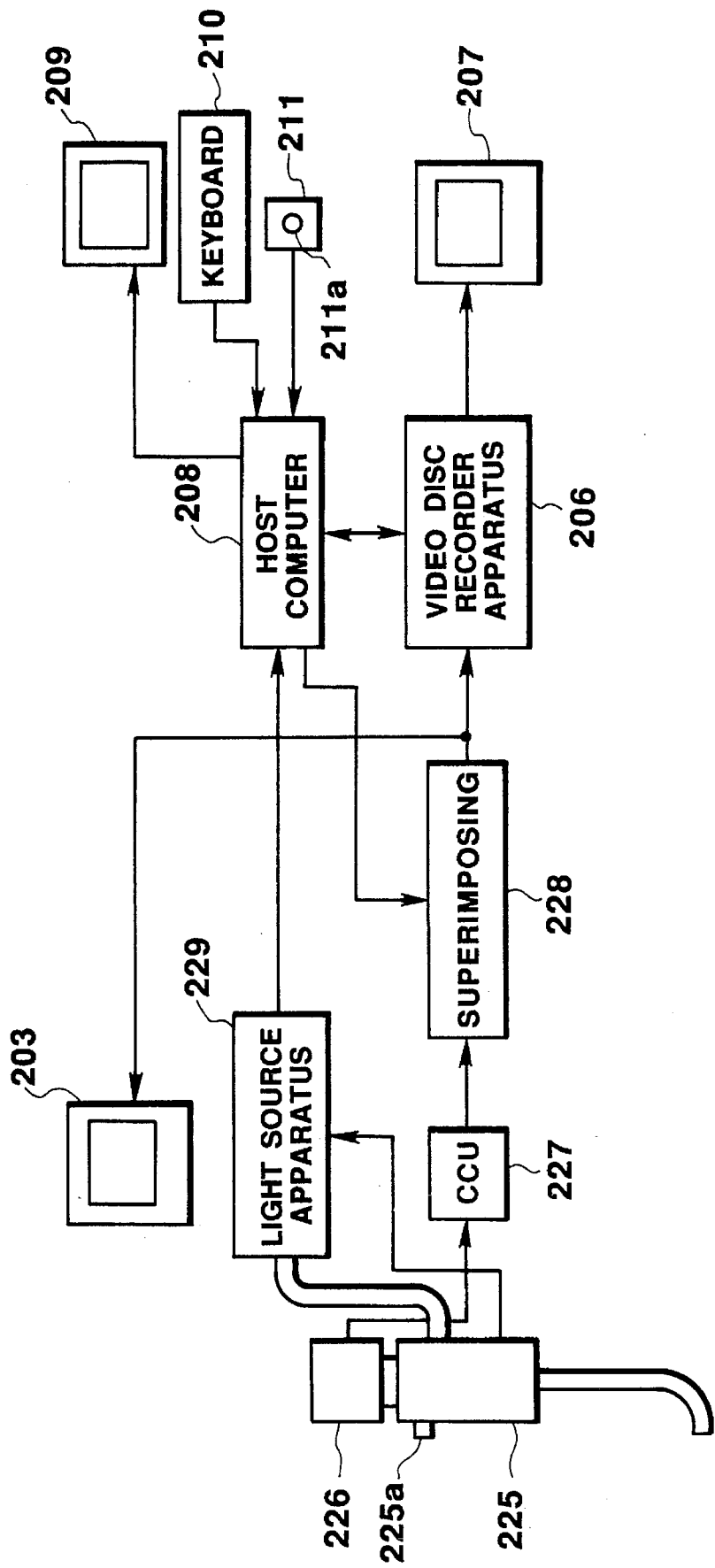
FIG. 35 relates to a second modification of the third embodiment of the present invention.

In FIG. 35 is shown the second modification of the third embodiment of the present invention.

In this modification, in an image filing system using a conventional fiber scope instead of an electronic scope, the electronic scope 201, video processor apparatus 204 and first keyboard 205 for the first modification are eliminated and instead a fiber scope apparatus 225, camera head 226, camera control unit (CCU) 227 and superimposing apparatus 225 are connected and the light source apparatus 229 is also different.

In this modification, the image output apparatus 242 comprises a fiber scope apparatus 225, camera head 226, CCU 227, light source apparatus 229, first TV monitor 203 and second keyboard 210 and the image reproducing apparatus 243 comprises a superimposing apparatus 228, video disc recorder apparatus 206, second TV monitor 207, host computer 208, computer display 209 and mouse 211.

In this modification, the signal of the release is transmitted to the host computer 208 through the light source apparatus 229 by the operation of the release switch 225, the image is imaged by the camera head 226 and is converted to a video signal by the CCU 227 and substantially same picture as the shown in FIG. 31 is output by the superimposing apparatus as a synthesizing means. In this case, the data and others are input by the second keyboard 210.

The other formations are the same as in the first modification.

In this modification, as the conventionally extensively used fiber scope can be used, many kinds of scopes can be connected and the operator can select and use a scope more adapted to the inspection.

In this system, the superimposing may be selectable. In this case, when the superimposing is not made, not only the endoscope image but also such various images as, for example, an ultrasonic endoscope image relating to the endoscope, image photographing the face of a patient and X-ray image can be managed together with the endoscope image.

By the way, the explanation has been made by using the endoscope system as an embodiment but the invention may be adapted to any other video instrument.

Also, separately utilizing R, G and B video signals has been explained but any combination may be used.

The character/device signal may be superimposed so that the R, G and B video signals may be respectively of the maximum values and the position of the character/device may be discriminated by these maximum vallues.

The character/device may be displayed in a specific address of a frame memory so that the specific address of the frame memory may be discriminated.

The superimposing means may be connected to the video instrument at the output end instead of being internally provided within the video instrument.

As explained above, according to the present invention, there are effects that the cable for transmitting information exchanging reference numerals is not required, the physical interfaces and protocols (communication procedures) of both instruments need not coincide with each other, information can be exchanged even in an instrument which can not output information exchanging reference numerals and at least one instrument need not be provided with such special means as a frequency multiplex means and can easily exchange the control/information between the video instruments.

It is apparent that, in this invention, working modes different in a wide range can be formed on the basis of this invention without deviating from the spirit and scope of the invention. This invention is not restricted by its specific working modes except being limited by the appended claims.

What is claimed is:

1. A medical instrument interfacing apparatus comprising:
a video instrument for outputting a video signal on which pattern information is superimposed, said pattern information corresponding to character information and device control information; said video instrument including an image information input means connected with an endoscope;
a video signal transmitting means for transmitting said video signal output by said video instrument;
a controlled apparatus in which operation is controlled in response to an input control signal; and
a pattern discriminating means for extracting said character information and said device control information from said video signal on which said pattern information is superimposed and for supplying a control signal to said controlled apparatus in response to said device control information, so as to control said controlled apparatus using said control signal in response to said device control information.

2. A medical instrument interfacing apparatus according to claim 1 wherein said endoscope includes an electronic endoscope internally provided with a solid state imaging device.

3. A medical instrument interfacing apparatus according to claim 1 wherein said endoscope includes a an externally fitted television camera for endoscopes and a camera controlling means for controlling said externally fitted television camera for endoscopes.

4. A medical instrument interfacing apparatus according to claim 1 wherein said video instrument includes an image input means connected with an ultrasonic endoscope and converting an observed image by said ultrasonic endoscope to a video signal.

5. A medical instrument interfacing apparatus according to claim 1 wherein said video instrument includes an image filing apparatus which reproduces a video signal.

6. A medical instrument interfacing apparatus according to claim 1, wherein said controlled apparatus is an image filing apparatus which is responsive to said input control signal to perform image filing, wherein said video signal comprises R, G, and B signals, and wherein said pattern discriminating means includes a controlling means for extracting the pattern information from at least one of said R, G and B signals of said video signal and outputting a control signal corresponding to said pattern information for controlling an image filing apparatus, and wherein said controlling means further includes an image filing controlling means for supplying said input control signal to said image filing apparatus for controlling image filing by said image filing apparatus.

7. A medical instrument interfacing apparatus according to claim 1, wherein said controlled apparatus is a VTR apparatus for recording of said video signal as a recorded image, said VTR apparatus being responsive to said input control signal to perform recording of said video signal, wherein said video signal comprises R, G, and B signals, and wherein said pattern discriminating means includes a controlling means for extracting the pattern information from at least one of said R, G and B signals of said video signal and outputting a control signal corresponding to said pattern information for controlling said VTR apparatus to record said video signal as a recorded image, and wherein said controlling means further includes a VTR controlling means for supplying said input control signal to said VTR apparatus for controlling said recording of said video signal by said VTR apparatus.

8. A medical instrument interfacing apparatus according to claim 1, wherein said controlled apparatus is an illumination controlling means which is responsive to said input control signal to produce illumination of the region viewed by said image information input means, wherein said video signal comprises R, G, and B signals, and wherein said pattern discriminating means includes a controlling means for extracting the pattern information from at least one of said R, G and B signals of said video signal and outputting a control signal corresponding to said pattern information for controlling illumination of a region viewed by said image information input means, and wherein said controlling means further includes an illumination controlling means for supplying said input control signal to said illumination controlling means for controlling said illumination of the region viewed by said image information input means by said illumination controlling means.

9. A medical instrument interfacing apparatus according to claim 1, wherein said controlled apparatus is a temperature apparatus controlling means which is responsive to said input control signal for controlling temperature of a chamber in which inspection by the endoscope is made, wherein said video signal comprises R, G, and B signals, and wherein said pattern discriminating means includes a controlling means for extracting the pattern information from at least one of said R, G and B signals of said video signal and outputting a control signal corresponding to said pattern information for controlling said temperature of said chamber in which inspection by the endoscope is made, and wherein said controlling means further includes a temperature apparatus controlling means for supplying said input control signal to said temperature apparatus controlling means for controlling said temperature of said chamber by said temperature apparatus controlling means.

10. A medical instrument interfacing apparatus according to claim 1, wherein said controlled instrument includes an image filing apparatus.

11. A medical instrument interfacing apparatus according to claim 1, wherein said controlled instrument includes a VTR apparatus.

12. A medical instrument interfacing apparatus according to claim 1, wherein said controlled instrument includes an illumination controlling apparatus.

13. A medical instrument interfacing apparatus according to claim 1, wherein said controlled instrument includes a temperature controlling apparatus.

14. A medical instrument interfacing apparatus according to claim 1, wherein said video signal comprises R, G, and B signals, and wherein said pattern discriminating means includes a character signal output means for extracting the pattern information from at least one of said R, G and B signals of said video signal and outputting a character signal.

15. A medical instrument interfacing apparatus according to claim 14, further comprising an image filing apparatus responsive to a character signal for performing image filing, wherein said character signal output means supplies said character signal to said image filing apparatus.

16. A medical instrument interfacing apparatus according to claim 14, wherein said character signal output means supplies said character signal to said image information input means.

17. A medical instrument interfacing apparatus according to claim 1 wherein said image information input means further includes a pattern information input means for inputting the pattern information of at least one of a character and device and an image synthesizing means for synthesizing the image information of said image input means and the pattern information of said pattern information input means with each other.

18. A medical instrument interfacing apparatus according to claim 17, wherein said pattern information input means includes a device information input means for inputting device information by a switching means, wherein said device information indicates character size of characters in said character information.

19. A medical instrument interfacing apparatus according to claim 17 wherein said pattern information input means includes a character input means for inputting a character information by an IC card.

20. A medical instrument interfacing apparatus according to claim 17, wherein said video signal is composed of R, G, and B color signals, and said pattern information input means includes a character input means for inputting a character by a keyboard, and further comprising a character signal discriminating means for extracting pattern information from at least one of said R, G, and B color signals and outputting a character signal, and a device information input means for inputting device information by a switch, wherein said device information indicates character size of characters in said character information.

21. A medical instrument interfacing apparatus comprising:

an image input means for outputting a video signal representing an image viewed by a medical instrument;

a pattern generating means for generating pattern information representing character information and device control information;

a superimposing means receiving said video signal from said image input means, for outputting a modified video signal in which said pattern information generated by said pattern generating means is superimposed on said video signal output by said image input means;

a video signal transmitting means for transmitting said modified video signal output by said superimposing means;

a pattern discriminating means for extracting said pattern information from said modified video signal transmitted by said video signal transmitting means, so as to obtain said character information and said device control information from said video signal transmitted from said video signal transmitting means, said pattern discriminating means producing a character information output signal representing said character information and a device control output signal representing said device control information extracted from said modified video signal transmitted from said video signal transmitting means; and a controlled apparatus which receives said device control output signal of said pattern discriminating means as a control signal for controlling operation of said controlled apparatus.

22. A medical instrument interfacing apparatus comprising:

an image input means for outputting a video signal representing an image viewed by a medical instrument;

a pattern generating means for generating pattern information representing character information and device control information;

a superimposing means receiving said video signal from said image input means, for outputting a modified video signal in which said pattern information generated by said pattern generating means is superimposed on said video signal output by said image input means;

a video signal transmitting means for transmitting said modified video signal output by said superimposing means;

a pattern discriminating means for extracting said pattern information from said modified video signal transmitted by said video signal transmitting means, so as to obtain said character information and said device control information from said video signal transmitted from said video signal transmitting means, said pattern discriminating means producing a character information output signal representing said character information and a device control output signal representing said device control information extracted from said modified video signal transmitted from said video signal transmitting means; and an image filing apparatus which receives said device control output signal of said pattern discriminating means as a control signal for controlling operation of said image filing apparatus, and wherein said image filing apparatus produces as an output a video signal representing said image viewed by the medical instrument.

23. A medical instrument interfacing apparatus according to claim 22, wherein said image filing apparatus is responsive to said control signal to perform image filing, wherein said video signal is composed of R, G, and B color signals, and wherein said pattern generating means includes a character input means for inputting a character by a keyboard, and further comprising a character signal discriminating means for extracting pattern information from at least one of said R, G, and B color signals from said image filing apparatus and outputting a character signal, and a device information input means for inputting device information by a switch, wherein said device information indicates character size of characters in said character information.

* * * * *